(12) United States Patent
Fukino

(10) Patent No.: US 9,025,257 B2
(45) Date of Patent: May 5, 2015

(54) LENS BARREL, IMAGE CAPTURING APPARATUS, AND MANUFACTURING METHOD

(75) Inventor: Kunihiro Fukino, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/550,971

(22) Filed: Jul. 17, 2012

(65) Prior Publication Data

US 2012/0281298 A1 Nov. 8, 2012

Related U.S. Application Data

(63) Continuation of application No. 12/654,599, filed on Dec. 24, 2009, now abandoned.

(30) Foreign Application Priority Data

Dec. 26, 2008 (JP) .................................. 2008-334002
Feb. 26, 2009 (JP) .................................. 2009-044833

(51) Int. Cl.
*G02B 7/10* (2006.01)
(52) U.S. Cl.
CPC ............. *G02B 7/10* (2013.01); *Y10T 29/49826* (2015.01)
(58) Field of Classification Search
CPC ............... G02B 7/10; G02B 7/04; G02B 7/02
USPC .................. 359/699–700, 703–704, 823, 702
See application file for complete search history.

(56) References Cited

U.S. PATENT DOCUMENTS

| 5,337,187 | A | | 8/1994 | Fukino et al. |
| 5,581,411 | A | | 12/1996 | Nomura et al. |
| 5,956,187 | A | * | 9/1999 | Shintani ........................ 359/696 |
| 6,035,136 | A | * | 3/2000 | Hayashi et al. ............... 359/700 |
| 6,069,745 | A | | 5/2000 | Fujii et al. |
| 6,396,644 | B2 | | 5/2002 | Hayashi et al. |
| 6,434,331 | B1 | * | 8/2002 | Araoka et al. .................. 396/72 |

(Continued)

FOREIGN PATENT DOCUMENTS

| JP | A-5-142475 | 6/1993 |
| JP | U-05-045617 | 6/1993 |

(Continued)

OTHER PUBLICATIONS

Apr. 25, 2011 Office Action issued in U.S. Appl. No. 12/654,599.

(Continued)

*Primary Examiner* — Zachary Wilkes
(74) *Attorney, Agent, or Firm* — Oliff PLC

(57) ABSTRACT

Provided is a lens barrel including: a guide shaft in an axial form supported by a reference member; a holding member holding an optical system, and movable in an axial direction of the guide shaft with respect to the reference member; and an interlocking member including an engaging section engaging with the holding member, the interlocking member moving in the axial direction while rotating around an optical axis of the optical system, and moving along the guide shaft without rotating the holding member. The lens barrel may include a driving cylinder including a cam groove engaging with the interlocking member, where when rotated around the optical axis, the driving cylinder drives the interlocking member by means of the cam groove, to cause the interlocking member to move linearly in the direction of the guide shaft.

30 Claims, 12 Drawing Sheets

(56) References Cited

U.S. PATENT DOCUMENTS

| | | |
|---|---|---|
| 6,556,359 B2 | 4/2003 | Emura et al. |
| 7,403,348 B2 | 7/2008 | Kuroda et al. |
| 2001/0028512 A1 | 10/2001 | Noguchi |
| 2008/0240709 A1 | 10/2008 | Nakamura |

FOREIGN PATENT DOCUMENTS

| | | |
|---|---|---|
| JP | A-7-120662 | 5/1995 |
| JP | A-11-194258 | 7/1999 |
| JP | A-2000-89086 | 3/2000 |
| JP | A-2005-91772 | 4/2005 |
| JP | A-2006-215340 | 8/2006 |
| JP | A-2008-278463 | 11/2008 |
| JP | A-2008-294546 | 12/2008 |

OTHER PUBLICATIONS

Jan. 20, 2012 Office Action issued in U.S. Appl. No. 12/654,599.
Oct. 4, 2011 Office Action issued in JP Application No. 2009-044833 (with English translation).

* cited by examiner

LENS BARREL, IMAGE CAPTURING APPARATUS, AND MANUFACTURING METHOD

CROSS REFERENCE TO RELATED APPLICATIONS

This is a continuation of U.S. patent application Ser. No. 12/654,599 filed Dec. 24, 2009, which claims priority from Japanese Patent Applications No. 2008-334002 filed on Dec. 26, 2008 and. No. 2009-044833 filed on Feb. 26, 2009. The contents of each of the above-identified applications is incorporated herein by reference in its entirety.

BACKGROUND

1. Technical Field

The present invention relates to a lens barrel, an image capturing apparatus, and a manufacturing method.

2. Related Art

Japanese Patent Application Publication No. H5-142475 discloses a zoom lens barrel having a lens movable in the direction of the optical axis both by a zoom operation and by a focusing operation. Japanese Patent Application Publication No. 2000-089086 discloses a zoom lens barrel of an internal focusing type operable to individually move a plurality of lens groups different from the front lens group using a cam mechanism, to vary the focused focal point and the focal length.

SUMMARY

A lens barrel whose holder supporting the optical system moves by being guided by a guide shaft has a structural restriction because the holder cannot rotate. Meanwhile, a zoom lens barrel of an internal focusing type has an optical performance susceptible to the accuracy of its cam mechanism. It is therefore preferable to simplify the cam mechanism by structuring the holder to be movable along a guide bar.

According to a first aspect related to the innovations herein, provided is a lens barrel (100) including: a guide shaft (192) in an axial form supported by a reference member (110); a holding member (189) holding an optical system (L2), and movable in an axial direction of the guide shaft with respect to the reference member; and an interlocking member (170) including an engaging section (174) engaging with the holding member, the interlocking member moving in the axial direction while rotating around an optical axis of the optical system, and moving along the guide shaft without rotating the holding member.

According to a second aspect related to the innovations herein, provided is an image capturing apparatus (300) including: the lens barrel (100); and an image capturing section (200) capturing an image of the optical system.

According to a third aspect related to the innovations herein, provided is a method of manufacturing a lens barrel, including: supporting a guide shaft (192) in an axial form by a reference member (110); holding an optical system (L2) by a holding member (189) movable in an axial direction of the guide shaft with respect to the reference member; and providing an interlocking member (170) including an engaging section (174) engaging with the holding member, the interlocking member moving in the axial direction while rotating around an optical axis of the optical system, and moving along the guide shaft without rotating the holding member.

According to a fourth aspect related to the innovations herein, provided is a lens barrel (103) including: a first guide shaft (102) provided for a first holder (492) that holds a first optical component (L22), the first guide shaft oriented in a direction of an optical axis (X) of the first optical component; a support member (412) supporting the first guide shaft to be movable in the direction of the optical axis; and a second guide shaft (104) provided for a second holder (491) that holds a second optical component (L21) different from the first optical component, the second guide shaft being movable with respect to the first guide shaft in the direction of the optical axis by being restricted by the first guide shaft.

According to a fifth aspect related to the innovations herein, provided is an image capturing apparatus (300), including: the lens barrel; and an image capturing section (200) capturing an image of the optical system.

According to a sixth aspect related to the innovations herein, provided is a method of manufacturing a lens barrel (103), including: providing a first guide shaft (102) provided for a first holder (492) that holds a first optical component (L22), the first guide shaft oriented in a direction of an optical axis of the first optical component; providing a support member (412) supporting the first guide shaft to be movable in the direction of the optical axis; and providing a second guide shaft (104) provided for a second holder (491) that holds a second optical component (L21) different from the first optical component, the second guide shaft being movable with respect to the first guide shaft in the direction of the optical axis by being restricted by the first guide shaft.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
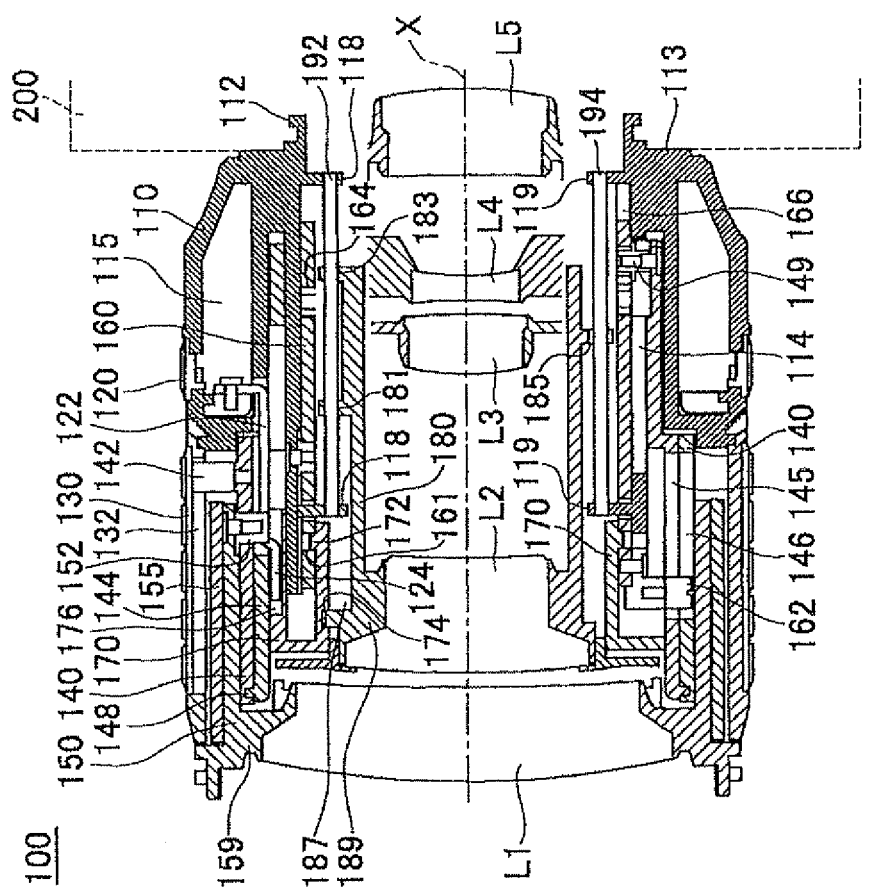
FIG. 1 is a sectional view of a lens barrel 100 whose magnification is adjusted to the wide angle side.

FIG. 1 is a sectional view of an entire lens barrel 100 situated at the wide angle end. The lens barrel 100 has five groups of lenses L1, L2, L3, L4, and L5 arranged on a common optical axis X.

When the lens barrel 100 performs a zoom operation, the lenses L1, L2, L3, L4, and L5 move relative to each other. Specifically, the lens L3 and lens L5 are connected to each other to form a pair, to integrally move at a constant interval therebetween. Meanwhile, when the lens barrel 100 performs a focusing operation, a particular lens L2 moves, and the other lenses L1, L3, L4, and L5 do not move. In other words, the lens L2 moves both in the zoom operation and in the focusing operation.

Note that in the zoom operation, the lens L2 moves in a relatively, large distance as with the other lenses L1, L3, L4, and L5, and moves in a relatively small amount in its focusing operation. The following explains the structure of performing a zoom operation for the lenses L1 and L2, and the structure of performing a focusing operation for the lens L2. The support structure and the driving structure of the other lenses L3, L4, and L5 are not explained in the following.

The lens barrel 100 includes a holding cylinder 180 and a pair of guide bars 192, 194 in a fixed cylinder 110. The lens L2 is held by a lens frame 189 formed at the tip (i.e. the left side in the drawing) of the holding cylinder 180.

The pair of guide bars 192 and 194 are arranged to oppose each other with the optical axis therebetween. The guide bar 192 is supported by a pair of support sections 118 provided on the internal upper surface of the fixed cylinder 110.

The holding cylinder 180 includes a front-side fitting section 181 and a rear-side fitting section 183 distanced from each other in the direction in which the guide bar 192 is oriented. Each of the front-side fitting section 181 and the rear-side fitting section 183 has a fitting hole of a form complementary to the circumference of the guide bar 192. For example, when the guide bar 192 has a round cross section, the fitting hole has a round shape. The guide bar 192 is inserted to this fitting hole. As a result, the holding cylinder 180 is suspended from the guide bar 192. Since the engagement with the guide bar 192 is provided by means of the front-side fitting section 181 and the rear-side fitting section 183 distanced from each other, the optical axis of the lens L1 is prevented from being tilted relative to the guide bar 192.

The guide bar 194 is supported in parallel to the guide bar 192 by means of a pair of support sections 119 provided on the internal lower surface of the fixed cylinder 110. The holding cylinder 180 includes an engaging section 185 provided to face, with the optical axis therebetween, the intermediate point between the front-side fitting section 181 and the rear-side fitting section 183 in the direction in which the guide bar 192 is oriented.

The engaging section 185 engages with the guide bar 194 by means of a pair of parallel planes sandwiching the guide bar 194. The pair of parallel planes are formed by an elongated slot or a U-shape groove. This helps reduce the sliding resistance of the holding cylinder 180 in moving along the guide bar 194, while preventing rotation of the holding cylinder 180 with the guide bar 192 being a rotation axis.

Inside the fixed cylinder 110, the cam cylinder 160 is provided coaxially with the fixed cylinder 110 to be positioned between the internal surface of the fixed cylinder 110 and the guide bars 192 or 194. The cam cylinder 160 is detailed later in greater detail.

A hollow forming a motor chamber 115 is created at the circumference of the rear side of the fixed cylinder 110 (the right side in the drawing). A motor, not shown in the drawing, is accommodated in the motor chamber 115. A focusing grip 120 is rotatably mounted to the circumference of the motor chamber 115.

An end of a transmission member 122 appears in the motor chamber 115, so that the focusing grip 120 or the motor selectively drives the transmission member 122. Thus driven transmission member 122 rotates around the optical axis X along the circumference of the fixed cylinder 110.

An inner cylinder 144, a intermediate cylinder 140, and an outer cylinder 150 are provided at the front end of the fixed cylinder 110, to be coaxial and in the stated order from inside. The zoom ring 130 is rotatably mounted to further outside of the outer cylinder 150. A lens frame 159 is formed at the front end of the outer cylinder 150, to hold the lens L1. A cam follower 152 is formed in the vicinity of the rear end of the outer cylinder 150, to be engaged with the inner cylinder 144.

A guide groove 132 is formed inside the zoom ring 130. The cam follower 142 of the intermediate cylinder 140 is engaged with this guide groove 132. According to this arrangement, when the zoom ring 130 is rotated, the generated rotation driving force is transmitted to the cam follower 142.

The intermediate cylinder 140 includes the cam follower 142 and a cam groove 146. The intermediate cylinder 140 further includes an engaging section 148 engaging with the inner cylinder 144. The inner cylinder 144 includes a cam groove 145 corresponding to the cam groove 146. The inner cylinder 144 further includes a cam pin 149.

The rear end of the inner cylinder 144 is guided into the guide section 114 of the fixed cylinder 110, so that the inner cylinder 144 advances or retreats. In response to this, when the cam follower 142 of the intermediate cylinder 140 is subjected to the rotation driving force, the intermediate cylinder 140 and the inner cylinder 144 cooperate with each other, to transmit a linear movement force to the cam follower 152.

The cam cylinder 160 includes cam grooves 161 and 166. The cam cylinder 160 further includes a cam follower 162. The cam pin 149 of the inner cylinder 144 is engaged with the cam groove 166. The cam follower 162 is engaged with the cam groove 146 of the intermediate cylinder 140 and with the cam groove 145 of the inner cylinder 144.

The lens barrel 100 further includes an interlocking ring 170 provided at the front end of the fixed cylinder 1.10 to be situated at both inside and outside the fixed cylinder 110. The interlocking ring 170 is provided along an inner side of the inner cylinder 144, to be rotatable around the optical axis X. The straight groove 176 oriented along the optical axis X is formed on the circumferential surface of the interlocking ring 170. The straight groove 176 is engaged with the tip 124 of the transmission member 122.

The interlocking ring 170 includes a circumferential groove 174 formed on the front side of the inner circumferential surface. The circumferential groove 174 is continuously formed in the circumferential direction, to be engaged with an engaging pin 187 protruding in the diameter direction from the holding cylinder 180. The interlocking ring 170 includes a cam follower 172 engaged with the cam groove 161 of the cam cylinder 160.

The fixed cylinder 110 is coupled to an image capturing section 200 detailed later, by means of a base 112 formed at the rear end, corresponding to the right end in the drawing. When the fixed cylinder 110 is coupled to the image capturing section 200, the mount surface 113 at the rear end surface of the fixed cylinder 110 abuts against the front surface of the image capturing section 200, thereby positioning the entire lens barrel 100.

When the focusing grip 120 is rotated in the lens barrel 100 having the above-stated structure, or when the transmission member 122 is driven by a motor, the transmission member 122 rotates around the optical axis X along the circumferential surface of the fixed cylinder 110. The rotation driving force of the transmission member 122 is transmitted to the interlocking ring 170 via the side wall of the straight groove 176.

As the interlocking ring 170 rotates in the circumferential direction, the cam follower 172 provided in the interlocking ring 170 rotates in the circumferential direction, too. During this operation, the cam follower 172 is engaged in the cam groove 161, and so is accordingly moved in the optical axis X direction along the cam groove 161, to displace the interlocking ring 170 in the direction of the optical axis X. The movement of the interlocking ring 170 in the direction of the optical axis X is transmitted to the holding cylinder 180, by abutting of the rear end surface of the circumferential groove 174 to the engaging pin 187.

The holding cylinder 180 does not rotate by its circumferential displacement being restrained by the guide bars 192 and 194. In addition, since the circumferential groove 174 is continuously formed in the circumferential direction, the rotation of the interlocking ring 170 around the optical axis X is not transmitted to the holding cylinder 180, by the sliding of the rear end surface of the circumferential groove 174 in the circumferential direction with respect to the engaging pin 187. Accordingly, the lens L2 moves in the optical axis X direction, without rotating in the circumferential direction, thereby focusing the optical system of the lens barrel 100. A series of focusing operations completes without moving the other lenses L1, L3, L4, and L5 at all.

Figure 2:
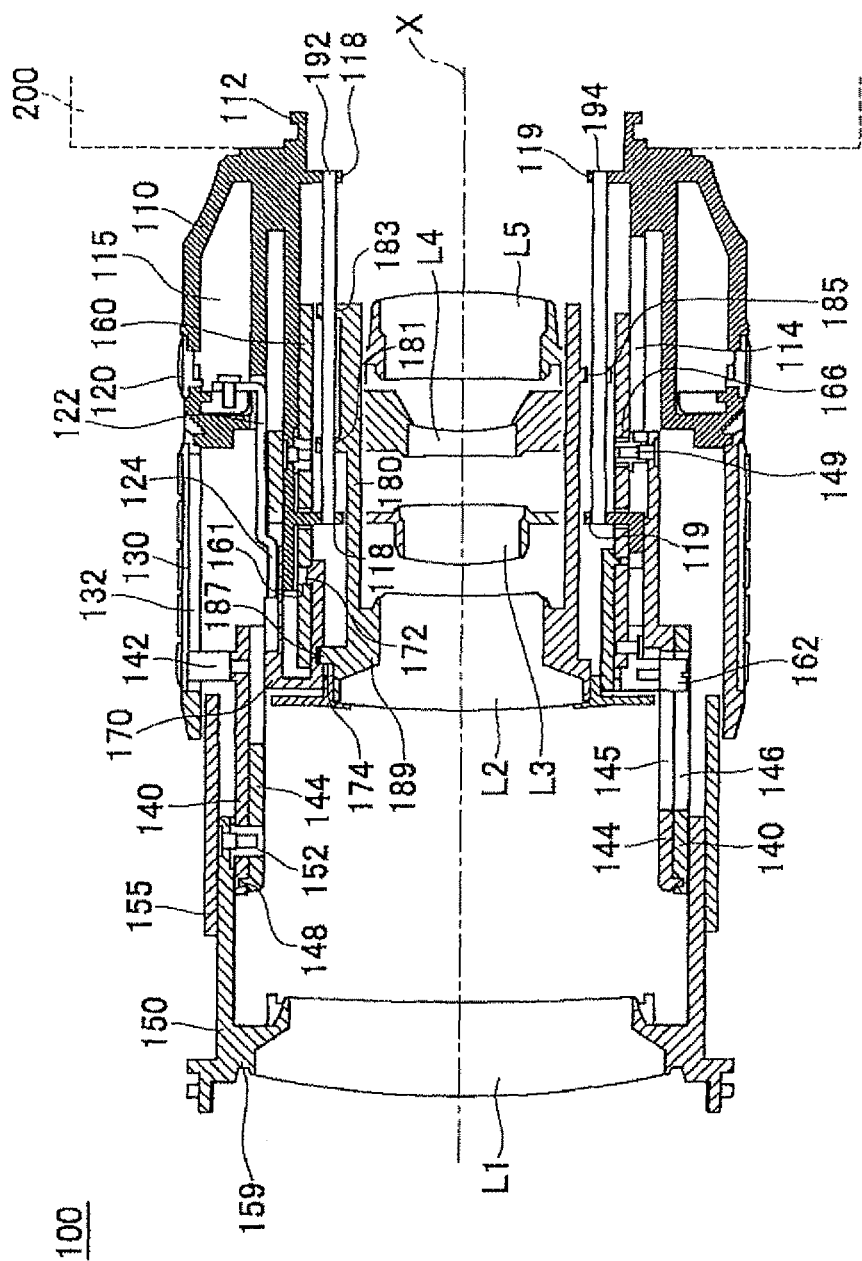
FIG. 2 is a sectional view of the lens barrel 100 whose magnification is adjusted to the telephoto side.

FIG. 2 is a longitudinal sectional view of the lens barrel 100, which draws a state where the lens barrel 100 zooms up to the telephoto end. In FIG. 2, the elements common to FIG. 1 are assigned the same reference numerals, and the explanation thereof is omitted.

When the zoom ring 130 is operated from outside to rotate around the optical axis X, the cam follower 142 of the intermediate cylinder 140 is engaged with the guide groove 132 of the zoom ring 130, and so the rotation driving force is transmitted to the intermediate cylinder 140. The inner cylinder 144 moves in the direction of the optical axis, by the guide section 114 of the fixed cylinder 110 guiding the rear end of the inner cylinder 144.

As the inner cylinder 144 moves in the direction of the optical axis, the intermediate cylinder 140 also moves, which is engaged with the inner cylinder 144 at the engaging section 148, thereby advancing the cam follower 152 of the outer cylinder 150 engaged with the intermediate cylinder 140. As a result, the outer cylinder 150 advances forward (toward the left side in the drawing), to advance the lens L1 held by the outer cylinder 150.

The intermediate cylinder 140 rotates, around the optical axis X, the cam cylinder 160 via the cam follower 162. By engagement of the cam pin 149 and the cam groove 166, the cam cylinder 160 moves in the direction of the optical axis X. On the other hand, the tip 124 of the transmission member 122 has entered the straight groove 176 of the interlocking ring 170, and so the interlocking ring 170 moves without rotating. Accordingly, the interlocking ring 170 whose cam follower 172 is engaged with the cam groove 161 of the cam cylinder 160 moves in the direction of the optical axis X in accordance with rotation and movement of the cam cylinder 160.

Since the circumferential groove 174 of the interlocking ring 170 is engaged with the engaging pin 187 of the holding cylinder 180, when the interlocking ring 170 has moved in the direction of the optical axis X, the linear movement force is transmitted, thereby integrally moving the holding cylinder 180 and the interlocking ring 170.

In the present embodiment, the interlocking ring 170 is provided with the circumferential groove 174, and the holding cylinder 180 is provided with the engaging pin 187. However, the engagement structure of the interlocking ring 170 and the holding cylinder 180 is not limited to this, and in fact, the circumferential groove 174 may be provided for the holding cylinder 180, and the engaging pin 187 may be provided for the interlocking ring 170.

In addition, the circumferential groove 174 may not be perfectly circular. In other words, it is sufficient that the circumferential groove 174 be in an arc-like shape which is larger than the angle of rotation of the focusing grip 120 and the interlocking ring 170. By this arrangement, the process amount of the interlocking ring 170 and so on can be reduced, to reduce the manufacturing cost of the lens barrel 100.

Furthermore, the circumferential groove 174 of the interlocking ring 170 may be formed as a cam groove intersecting a plane orthogonal to the optical axis X. By doing so, when the interlocking ring 170 rotates relative to the holding cylinder 180, the holding cylinder 180 can be individually driven in the direction of the optical axis X. This enables correction of the focusing tolerance attributable to movement on the zooming cam at the time of focusing.

Since the cam follower 172 of the interlocking ring 170 is engaged with the cam groove 161 of the cam cylinder 160, when the cam cylinder 160 moves in the direction of the optical axis X, and when the cam groove 161 drives the cam follower 172 by means of the rotation of the cam cylinder 160, a driving force in parallel to the optical axis X is transmitted to the holding cylinder 180. In this case, the holding cylinder 180 is fitted to the guide bar 192 as well as being engaged with the guide bar 194, the lens L2 can be moved in the direction parallel to the optical axis X without tilting the lens L2.

Although not shown in the drawings, the other lenses L3, L4, and L5 may also be moved by means of the other cam grooves 164 provided for the cam cylinder 160. In addition, the other lenses L3, L4, and L5 may be used together with the guide bars 192 and 194. Furthermore, further guide members or driving members may be provided for the purpose of guiding the other lenses L3, L4, and L5. By doing so, all the lenses L1, L2, L3, L4, and L5 will move, to change the focal length of the optical system of the lens barrel 100.

A cover cylinder 155 mounted coaxially with the fixed cylinder 110 is provided between the outer cylinder 150 and the zoom ring 130. The cover cylinder 155 advances or retreats together with the outer cylinder 150, to seal between the outer cylinder 150 and the zoom ring 130. Accordingly, dust is prevented from entering the lens barrel 100.

The fixed cylinder 110 is coupled to an image capturing section 200 detailed later, by means of a base 112 formed at the rear end, corresponding to the right end in the drawing. When the fixed cylinder 110 is coupled to the image capturing section 200, the mount surface 113 at the rear end surface of the fixed cylinder 110 closely abuts against the front surface of the image capturing section 200, thereby positioning the entire lens barrel 100.

As stated above, according to the embodiments of FIGS. 1 and 2, the lens barrel 100 includes an interlocking ring 170 engaged to the holding cylinder 180 holding the lens L2, to be rotatable around the optical axis X of the lens L2. In the zoom operation, the interlocking ring 170 moves the lens L2 in the direction of the optical axis X, by means of the rotation driving force transmitted from the zoom ring 130 via the cam cylinder 160. In the focusing operation, the interlocking ring 170 moves the lens L2 in the direction of the optical axis X, by means of the rotation force transmitted from the focusing grip 120 or the motor via the transmission member 122.

The holding cylinder 180 moves only in the direction of the optical axis X, by being guided by the guide bars 192 and 194. As a result, the zoom operation and the focusing operation can be achieved while reducing the number of items which are possible cause of mechanical errors.

It is preferable that the cam follower 172 for driving the interlocking ring 170 be provided on the extension line of the guide bar 192 or in the vicinity thereof, for efficient transmission of the driving force to alleviate the operation power of the holding cylinder 180. This arrangement causes the position from which the driving force is applied to approach the position of the guide bar 192 being the load resistance thereagainst, to efficiently prevent the lens L2 from tilting and so on.

The lens barrel 100 as stated above can be manufactured by a manufacturing method including each step stated below. One of the steps controls the fixed cylinder 110 to give an instruction to the guide bars 192 and 194 in an axial form. In another of the steps, the lens L2 is held by the lens frame 189 movable in the axial direction of the guide bars 192 and 194 with respect to the fixed cylinder 110. In a still different step, provided is an interlocking ring 170 that includes a circumferential groove 174 engaged with the lens frame 189, that moves in the lengthwise direction of the guide bars 192 and 194 while rotating around the optical axis of the lens L2, and that moves along the guide bars 192 and 194 without rotating the lens frame 189.

Figure 3:
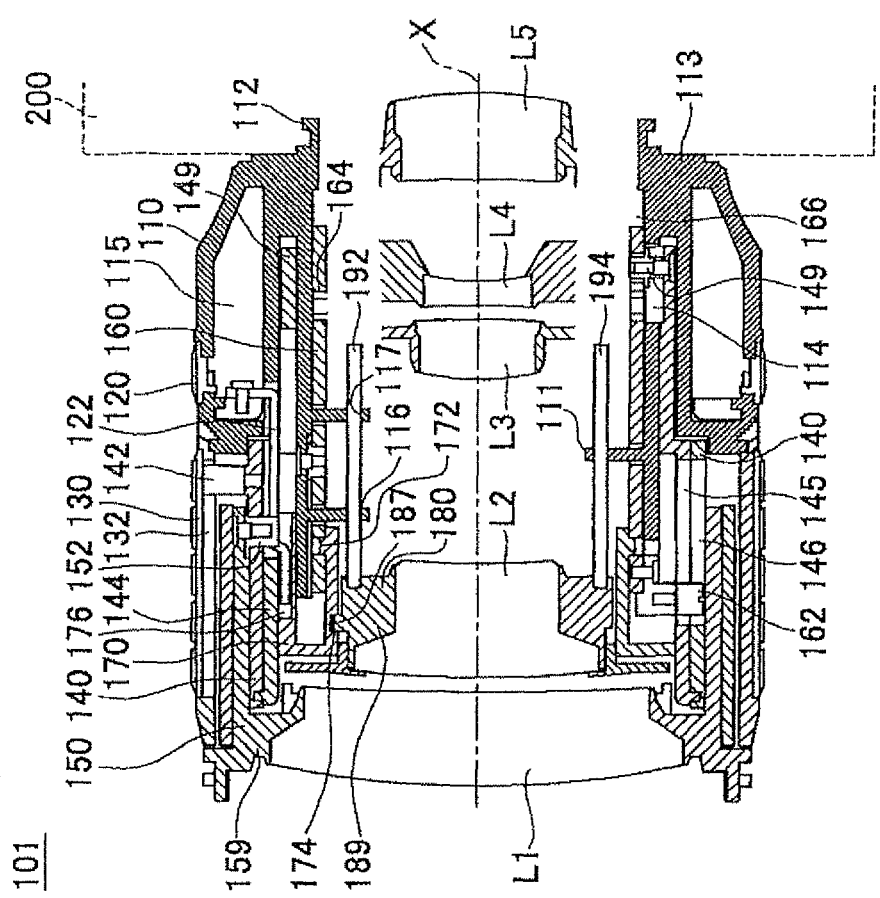
FIG. 3 is a sectional view of a lens barrel 101 whose magnification is adjusted to the wide angle side.
Figure 4:
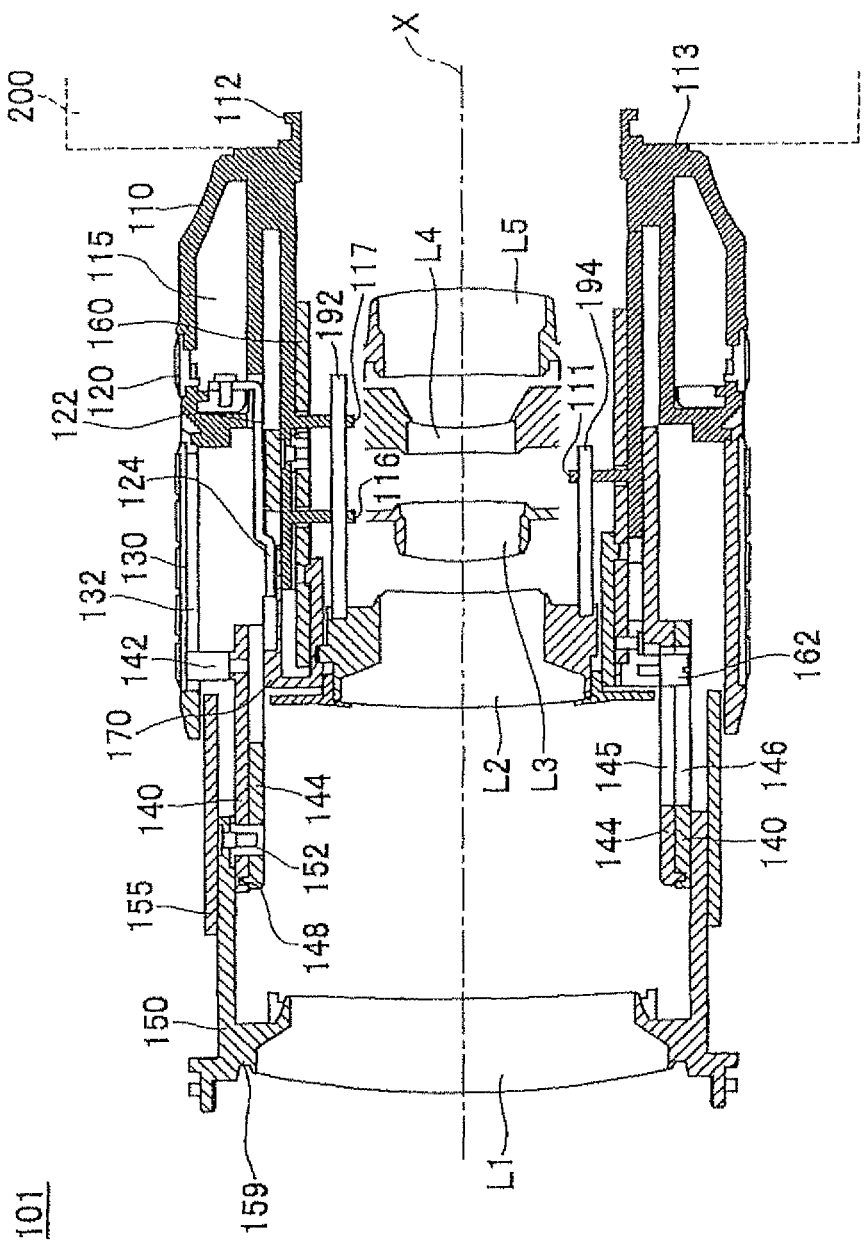
FIG. 4 is a sectional view of the lens barrel 101 whose magnification is adjusted to the telephoto side.

FIGS. 3 and 4 are sectional views of the structure of a lens barrel 101 having a different structure. FIG. 3 shows a sate where the lens barrel 101 is at the wide angle end. FIG. 4 shows a state where the lens barrel 101 is changed to the telephoto end by a zoom operation.

The lens barrel 101 has a structure common to the lens barrel 100 shown in FIGS. 1 and 2, except for the following. Therefore, in FIGS. 3 and 4, the elements common to FIGS. 1 and 2 are assigned the same reference numerals, and the explanation thereof is omitted.

A characteristic of the lens barrel 101 is that the guide bars 192 and 194 are coupled to the holding cylinder 180, and move in the direction parallel to the optical axis X together with the holding cylinder 180. That is, the front ends (i.e. left side in the drawing) of the guide bars 192 and 194 are coupled to the holding cylinder 180.

The guide bar 192 is supported by the front-side fitting section 116 and the rear-side fitting section 117 formed on the inner surface of the fixed cylinder 110. Here, the front-side fitting section 116 and the rear-side fitting section 117 have insertion holes having complementary forms to each other on a circumferential surface of the guide bar 192, and the guide bar 192 is inserted to the holes. Accordingly, the fixed cylinder 110 suspends the holding cylinder 180 via the guide bar 192, to be movable in the direction parallel to the optical axis X.

The guide bar 194, on the other hand, is supported by the engaging section 111 provided on an inner lower surface of the fixed cylinder. The engaging section 111 engages with the guide bar 194 by a pair of parallel planes sandwiching the guide bar 194.

The lens barrel 101 stated above has a shorter holding cylinder 180 compared to the lens barrel 100. Furthermore, the rear-end portion of the holding cylinder 180 (especially a portion to hold the guide bars 192 and 194) becomes unnecessary, to allow for an empty space inside the fixed cylinder 110. As a result, either the lens barrel 101 can be made narrower, or more materials can be accommodated in the lens barrel 101.

Figure 5:
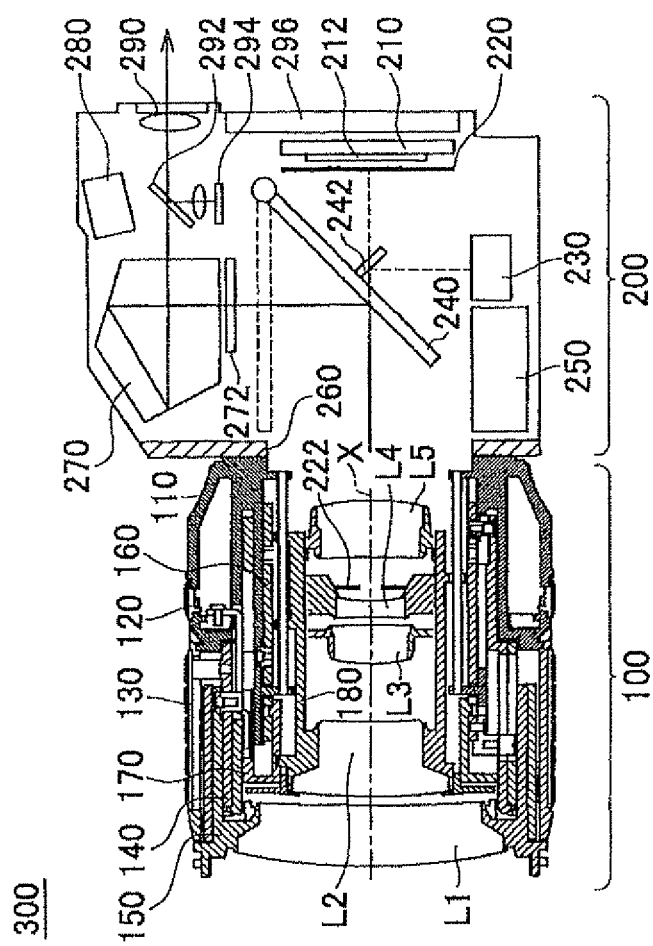
FIG. 5 is a schematic view of a structure of an image capturing apparatus 300.

FIG. 5 is a schematic view of a structure of an image capturing apparatus 300 having a lens barrel 100. So as to simplify the drawing, FIG. 5 draws the lens barrel 100 schematically. Note that the lens barrel 100 in FIG. 5 has the same structure as the lens barrel 100 in FIG. 1. Therefore, In FIG. 5, the elements common to FIG. 1 are assigned the same reference numerals, and the explanation thereof is omitted.

The lens barrel 100 is removably mounted to the image capturing section 200 via the mount 260. In the image capturing apparatus 300, the lens barrel 100 and the image capturing section 200 are also electrically coupled via a connection terminal not shown in the drawing. As a result, the lens barrel 100 is provided with power from the image capturing section 200.

The image capturing section 200 accommodates therein an optical system and a main control section 250, where the optical system includes a primary mirror 240, a penta prism 270, and an ocular optical system 290. The primary mirror 240 moves between a wait position positioned tilted on the optical path of the incident light incident via the optical system of the lens barrel 100 and an image capturing position raising by avoiding the incident light (shown by the dotted line in the drawing).

The primary mirror 240 at the wait position introduces the most of the incident light to the focusing screen 272 provided above. The focusing screen 272 is positioned at the focused focal point of the optical system of the lens barrel 100, to focus an image formed by the optical system.

The image focused on the focusing screen 272 can be observed from the ocular optical system 290 via the penta prism 270. Accordingly, the image on the focusing screen 272 can be seen as a normal image from the ocular optical system 290.

A half mirror 292 is provided between the penta prism 270 and the ocular optical system 290. The half mirror 292 causes the display image formed on the finder LCD 294 to be superimposed on the image of the focusing screen 272. As a result, at the output end of the ocular optical system 290, the image of the focusing screen 272 can be observed superimposed with the image of the finder LCD 294. Note that the information such as image capturing condition and setting condition of the image capturing apparatus 300 is displayed on the finder LCD 294.

A part of the output light from the penta prism 270 is guided towards a photometric unit 280. The photometric unit 280 measures the intensity and the distribution of the incident light, to enable the measurement result to be referred to when determining the image capturing condition.

A secondary mirror 242 is provided at the rear surface of the primary mirror 240 opposite to the incident surface for the incident light. The secondary mirror 242 guides a part of the incident light transmitted through the primary mirror 240 towards the focus detection apparatus 230 provided below. Consequently, when the primary mirror 240 is in the wait position, the focus detection apparatus 230 detects the focusing state of the optical system. When the primary mirror 240 has reached to the image capturing position, the secondary mirror 242 retreats from the optical path of the incident light, too.

At the rear side of the primary mirror 240 with respect to the incident light from the lens barrel 100, a shutter 220, an optical filter 212, and an image capturing element 210 are provided along the optical axis. Since the primary mirror 240 has moved to the image capturing position immediately before the shutter 220 is open, the incident light goes straight to be incident to the image capturing element 210. Accordingly, the image formed by the incident light will be converted to an electric signal by the image capturing element 210.

The image capturing section 200 includes a main LCD 296 facing to outside, at the back of the lens barrel 100. The main LCD 296 can display an image formed in the image capturing element 210 when the primary mirror 240 has moved to the image capturing position, as well as displaying various types of setting information for the image capturing section 200.

The main control section 250 controls the various operations as stated above, in an integrated manner. The main control section 250 can also form an autofocus mechanism for driving the lens barrel 100, by referring to the information on the distance up to the subject detected by the focus detection apparatus 230 of the image capturing section 200. It is also possible that the focus detection apparatus 230 form a focus aid mechanism by referring to the operation amount of the lens barrel 100.

The main control section 250 also controls opening/closing of a diaphragm apparatus 222 by exchanging information with the microcomputer of the lens barrel 100. Furthermore, the main control section 250 contributes to exposure automation, execution of scene modes, and execution of bracket image capturing, etc.

Figure 6:
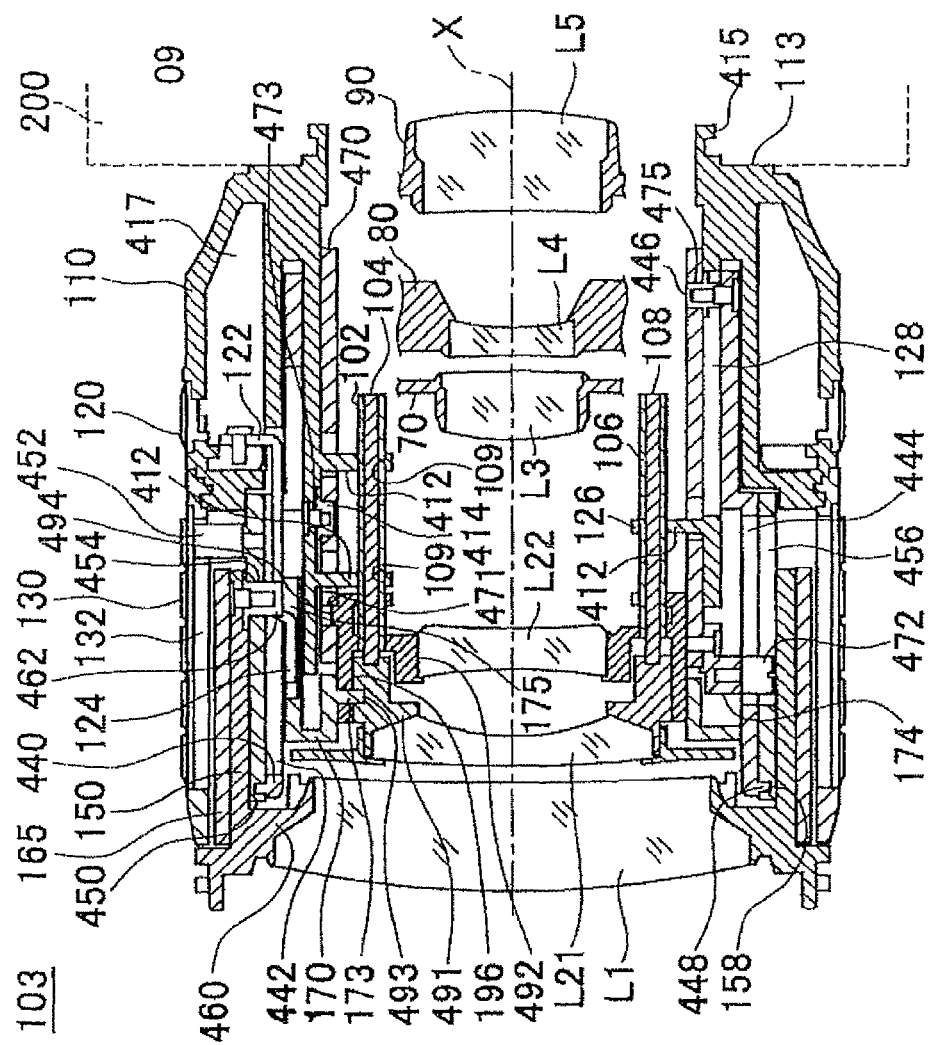
FIG. 6 is a sectional view of a lens barrel 103 whose magnification is adjusted to the wide angle end.

FIG. 6 is a sectional view of the lens barrel 103. The lens barrel 103 includes six groups of lenses L1, L21, L22, L3, L4, and L5, which are arranged sequentially on a common optical axis X. The lenses L1, L21, L22, L3, L4, and L5 are respectively supported by lens frames 460, 491, 492, 70, 80, and 90. Note that the lens barrel 103 is a zoom lens of an internal focusing type, and the drawing shows a state where the lens barrel 103 is at the wide angle end.

The lens barrel 103 includes a fixed cylinder 110 fixed to an image capturing section 200 that includes an image sensor or the like. An inner cylinder 440, a intermediate cylinder 450, an outer cylinder 150, and a zoom ring 130 that are coaxial to each other are provided at the front end circumference of the fixed cylinder 110, in the stated order from inside.

A focusing grip 120 is provided rotatably in the vicinity of the rear end of the outside of the fixed cylinder 110 (i.e. in the vicinity of the right side of the drawing). The fixed cylinder 110 includes therein a cam cylinder 470 rotatable with respect to the fixed cylinder 110. The cam cylinder 470 includes therein a pair of guide pipes 102 and 106, and a pair of guide bars 104 and 108 that are parallel to the optical axis X.

The fixed cylinder 110 includes a mount 415 at the rear end (i.e. the right end in the drawing). The fixed cylinder 110 coupled to the image capturing section 200 via the mount 415 has a mount surface 113 at the rear end thereof that closely abuts against the front surface of the image capturing section 200. Accordingly, the entire lens barrel 103 can be positioned with respect to the image capturing section 200.

A hollow forming a motor chamber 417 is created at the rear side of the circumference of the fixed cylinder 110. A motor, not shown in the drawing, is accommodated in the motor chamber 417. An end of a transmission member 122 is placed in the motor chamber 417. The focusing grip 120 or the motor selectively drives the transmission member 122, thereby rotating the transmission member 122 along the circumference of the fixed cylinder 110, with the optical axis X being the rotation center.

The inner cylinder 440 includes: a straight groove 442 oriented in the optical axis X direction; a bore 444 provided away from the straight groove 442, and a cam follower 446 protruding towards inside in the diameter direction in the vicinity of the rear end. The cam follower 446 penetrates an elongated slot 128 provided for the fixed cylinder 110 in the direction of the optical axis X. In this way, the inner cylinder 440 moves in the direction of the optical axis X without rotating, with respect to the fixed cylinder 110.

The tip of the cam follower 446 engages with the cam groove 475 of the cam cylinder 470. According to this arrangement, when the cam cylinder 470 rotates, the driving force for moving the inner cylinder 440 in the direction of the optical axis X is transmitted to the cam follower 446 from the cam groove 475.

The intermediate cylinder 450 includes a cam follower 452, a cam groove 454, and a straight groove 456. The cam follower 452 protrudes towards outside in the diameter direction. The cam groove 454 is tilted relative to the optical axis X. The straight groove 456 is oriented in the direction of the optical axis X. The intermediate cylinder 450 engages with an engaging protrusion 448 of the inner cylinder 440, at an engaging groove 158. According to this arrangement, the intermediate cylinder 450 can move integrally with the inner cylinder 440, relative to the fixed cylinder 110 in the direction of the optical axis X, as well as being rotatable around the optical axis X.

The outer cylinder 150 includes a cam follower 462 protruding toward inside in the diameter direction thereof. The earn follower 462 engages with the cam groove 454 of the intermediate cylinder 450 and with the straight groove 442 of the inner cylinder 440. The front end of the outer cylinder 150 is coupled to the lens frame 460 holding the lens L1.

When operated to rotate from outside, the zoom ring 130 rotates around the fixed cylinder 110. The zoom ring 130 also has a guide groove 132 oriented as a straight line parallel to the optical axis X. The guide groove 132 engages with the cam follower 452 of the intermediate cylinder 450. According to this arrangement, when the zoom ring 130 is operated to rotate, the intermediate cylinder 450 also rotates around the optical axis X.

The cam cylinder 470 is rotatably provided inside the fixed cylinder 110. The cam cylinder 470 includes cam grooves 471, 473, and 475 provided to tilt relative to the optical axis X, and a earn follower 472 fixed to the front end via a link 171.

The cam follower 472 engages with the straight groove 456 of the intermediate cylinder 450, via the bore 444 of the inner cylinder 440. The cam groove 471 engages with the cam follower 494 provided for the lens frame 492. The cam groove 473 engages with the cam pin 414 protruding to be fixed to the inner surface of the fixed cylinder 110. The cam groove 475 engages with the cam follower 446 of the inner cylinder 440.

The pair of guide pipes 102 and 106 are hollow shafts, and are supported by a support 412 provided on an inner surface of the fixed cylinder 110, to be symmetric to each other with respect to the optical axis X. The guide bars 104 and 108 are respectively inserted to the guide pipes 102 and 106.

Among the plurality of supports 412, a pair of supports 412 supporting the guide pipe 102 positioned above in the drawing respectively have a fitting hole 109 in a form complementary to the circumference of the guide pipe 102. The guide pipe 102 is inserted to be slidable to the fitting hole 109. By doing so, the guide pipe 102 can move in the axial direction, while being restricted from being displaced in the other directions.

The pair of supports 412 supporting the guide pipe 102 are preferably provided in an interval as wide as possible therebetween. Accordingly, it becomes possible to restrict the variations that tend to occur to the guide pipe 102 attributable to an inevitable interval between the guide pipe 102 and the fitting hole 109.

A support 412 supporting the guide pipe 106 positioned below in the drawing includes a U-shape groove 126 that includes parallel planes having the interval that is the same as the outer diameter of the guide pipe 102. The guide pipe 106 is inserted to the U-shape groove 126 to be slidable. By doing so, the guide pipe 106 can move in the axial direction, while being restricted from being displaced in the direction intersecting the paper on which the drawing is drawn.

A support 412 restricting the guide pipe 106 is provided to restrict the rotation of the lens frame 492 with the guide pipe 102 being a rotation axis. In addition, the guide pipe 102 restricts the inclination of the lens frame 492 with respect to the optical axis X.

Therefore, there can be only one support 412 for restricting the guide pipe 106. However, to facilitate smooth movement of the guide pipes 102 and 106, it is preferable that the support 412 supporting the guide pipe 106 be provided in the center of the pair of supports 412 supporting the guide pipe 102 in the direction of the optical axis X.

The end of each of the guide pipes 102 and 106 is coupled to the lens frame 492, so that the guide pipes 102 and 106, and the lens frame 492 can move in an integral manner. As a result, the guide pipe 106 restricts the lens frame 492 from rotating with the guide pipe 102 being a rotation axis. Consequently, the lens frame 492 can move in the direction of the optical axis X, while being restricted from being displaced in the other directions.

The guide bars 104 and 108 are inserted to the guide pipes 102 and 106 to be slidable. The end of each of the guide bars 104 and 108 is coupled to the lens frame 491, so that the lens frame 491 can move in the direction of the optical axis X, while being restricted from being displaced in the other directions.

Note that the guide bars 104 and 108 are supported by a pair of guide pipes 102 and 106, to be positioned. In this way, the position at which the guide bars 104 and 108 are positioned is wider than the interval between the supports 412 supporting the guide pipes 102 and 106. Accordingly, the guide bars 104 and 108 guide the lens frame 491 in a more stable manner.

In the present embodiment, the guide bars 104 and 108 for guiding the lens frame 491 are provided coaxially with the guide pipes 102 and 106 for guiding the lens frame 492. However, the relation of the members for guiding the lens frames 491 and 492 is not limited to the coaxial relation.

That is, the guide mechanism of the lens frames 491 and 492 by means of the guide pipes 102 and 106 and the guide bars 104 and 108 may be different from as stated above, as long as it guides the lens frames 491 and 492 to move in the direction of the optical axis X while restricting the displacement thereof in the direction intersecting the optical axis X. Concretely, a mechanism may be adopted where the inside of the U-shape groove 126 or the fitting hole 109 of the support 412 is divided into a plurality of complementary sectional forms (e.g., a mechanism of using a pair of guide axes respectively having a semicircular form in relation to the round fitting hole 109).

The lens barrel 103 further includes an interlocking ring 170 at the front end of the fixed cylinder 110, in such a form to cover both the inner and outer surfaces of the fixed cylinder 110. The interlocking ring 170 rotates around the optical axis X along the circumferential surface of the fixed cylinder 110 and the inner surface of the cam cylinder 470, by being subjected to the rotation driving force from the tip 124 of the transmission member 122 engaged with the straight groove 175 oriented parallel to the optical axis X.

The interlocking ring 170 includes a cam pin 173 protruding toward inside in the diameter direction. The cam pin 173 penetrates the circumferential groove 196 formed on the lens frame 492, so that its tip is engaged with the cam groove 493 formed on the lens frame 491. Accordingly, the interlocking ring 170 transmits a driving force to the cam groove 493 while rotating without being intervened by the lens frame 492.

The other lenses L3, L4, and L5 may use an existing movement mechanism since it is sufficient that they move only when varying the magnification of the lens barrel 103. In other words, they can be moved by guiding the lens frames 70, 80, and 90 to a cam groove and a straight groove provided for the cam cylinder 470 and the fixed cylinder. A structure is also possible where the guide pipes 102 and 106 are used to guide the lens frames 70, 80, and 90.

Figure 7:
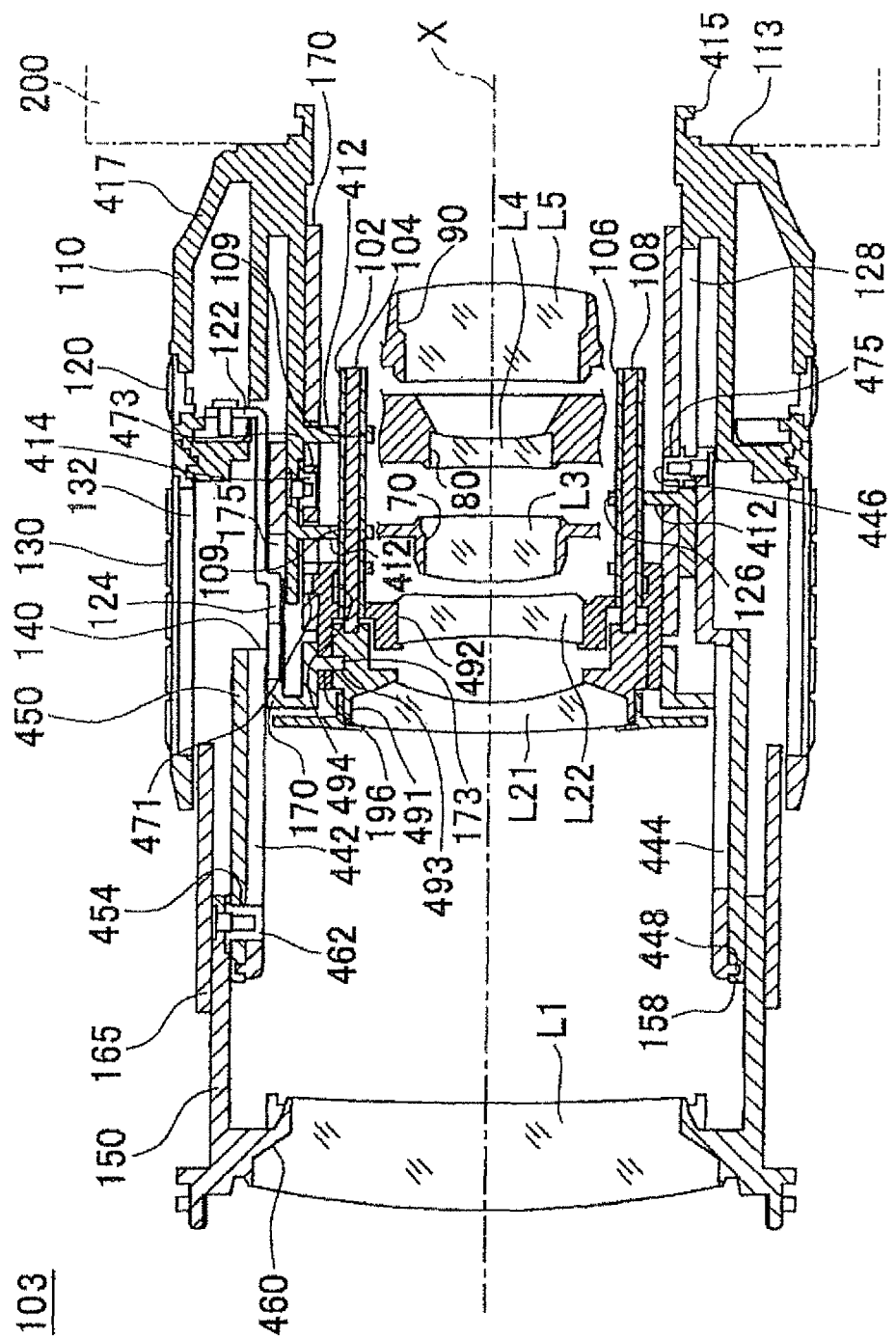
FIG. 7 is a sectional view of the lens barrel 103 whose magnification is adjusted to the telephoto end.

FIG. 7 is a sectional view of the lens barrel 103 whose lens barrel 103 is zoomed up to the telephoto end. In FIG. 7, the elements common to FIG. 6 are assigned the same reference numerals, and the following explanation mainly focuses on the zoom operation of the lens barrel 103, omitting the overlapping explanation with the explanation with reference to FIG. 6.

When the zoom ring 130 of the lens barrel 103 is rotated around the optical axis X, the intermediate cylinder 450 rotates by given the rotation driving force via the cam follower 452 engaged with the guide groove 132. When the intermediate cylinder 450 is rotated, the outer cylinder 150 moves in the direction of the optical axis X along the straight groove 442, by means of the driving force transmitted to the cam follower 462 from the cam groove 454. As a result, the lens frame 460 coupled to the tip of the outer cylinder 150 integrally moves with the lens L1 held by the lens frame 460.

When the intermediate cylinder 450 rotates, the rotation is conveyed to the cam cylinder 470 via the cam follower 472 engaged with the straight groove 456. Accordingly, the cam cylinder 470 rotates around the optical axis X.

When the cam cylinder 470 rotates, the lens frame 492 is driven via the cam follower 494 engaged with the cam groove 471. The lens frame 492 is guided by the guide pipes 102 and 106, to move in the direction of the optical axis X together with the lens L22. The lens frame 492 moving in the direction of the optical axis X conveys a driving force also to the cam pin 173 penetrating the circumferential groove 196, to move the interlocking ring 170 and the lens frame 491 too. Accordingly, the lens L21 held by the lens frame 491 also moves in the direction of the optical axis X.

It is preferable that the cam pin 173 and the cam follower 494 be provided as near as possible to the guide pipe 102 and the guide bar 104 in the circumferential direction of the interlocking ring 170 or the lens frame 492, respectively. As a result, the efficiency of driving the lens frames 491 and 492 by the cam pin 173 or the cam groove 471 improves.

Since the cam pin 414 engaged with the cam groove 473 is fixed to the fixed cylinder 110, the cam cylinder 470 itself will move in the direction of the optical axis X along the internal surface of the fixed cylinder 110, in accordance with the rotation of the cam cylinder 470. Furthermore, when the cam cylinder 470 is rotated, the driving force is also conveyed to the cam follower 446 engaged with the cam groove 475. As a result, the cam follower 446 moves the inner cylinder 440 in the direction of the optical axis X.

Due to the series of operations, the lens barrel 103 either stretches or contracts, to advance the lens L1 and the lens L2, as well as enlarging the interval therebetween. Note that the mechanisms not shown in the drawing will move the other lenses L3, L4, and L5, to vary the intervals thereamong. This results in change in the focal length of the entire lens barrel 103.

A cover cylinder 165 mounted coaxially with the fixed cylinder 110 is provided between the outer cylinder 150 and the zoom ring 130. The cover cylinder 165 advances or retreats together with the outer cylinder 150, to seal between the outer cylinder 150 and the zoom ring 130. Accordingly, dust is prevented from entering the lens barrel 103.

Figure 8:
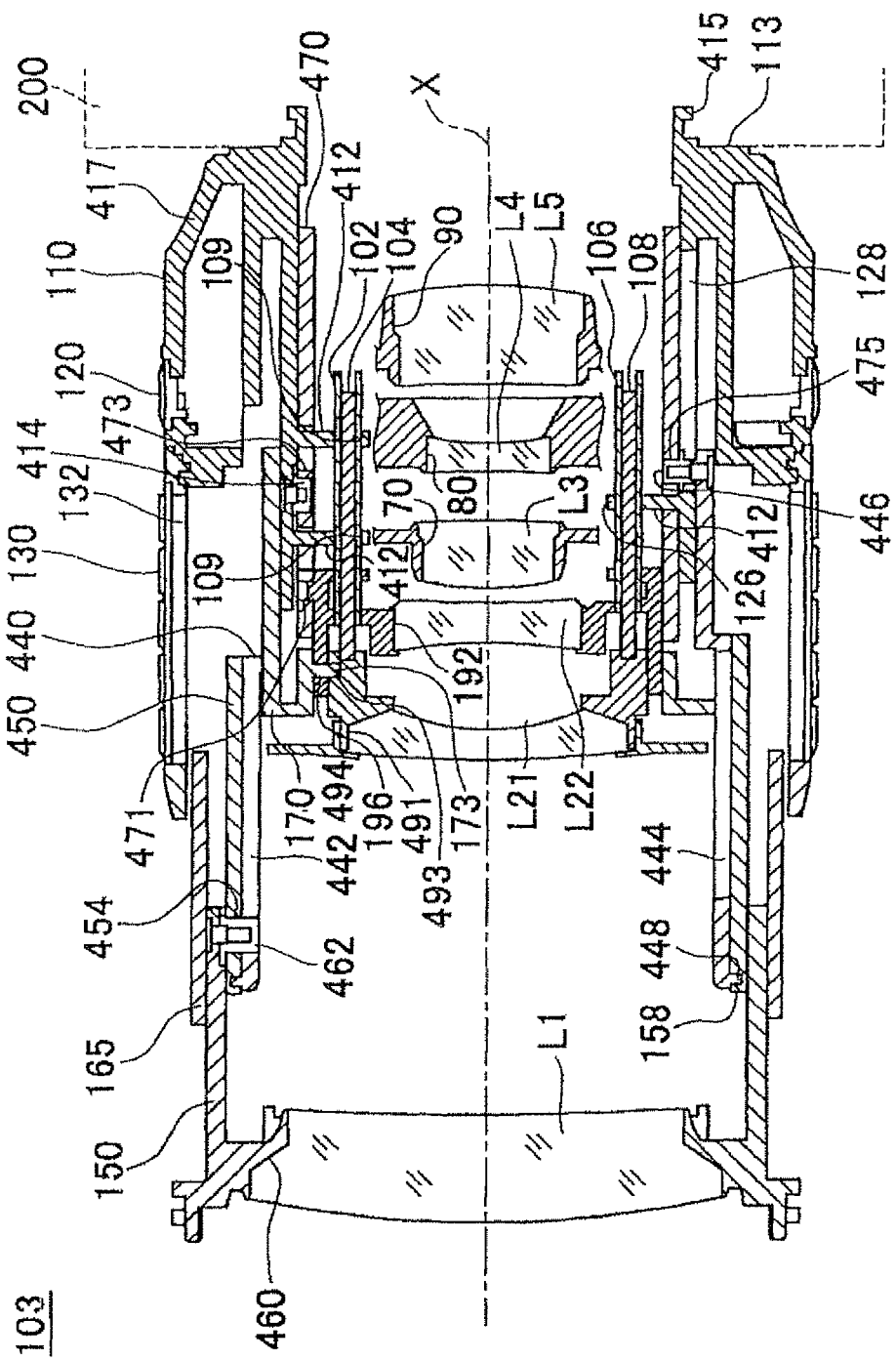
FIG. 8 is a sectional view of the lens barrel 103 focused at the telephoto end.

FIG. 8 explains the focusing operation of the lens barrel 103. In FIG. 8, the elements common to FIG. 6 and FIG. 7 are assigned the same reference numerals, and the explanation thereof is omitted.

When the focusing grip 120 is rotated, or when the motor drives the transmission member 122, the transmission member 122 rotates around the optical axis X along the circumferential surface of the fixed cylinder 110. The rotation driving force of the transmission member 122 is transmitted to the interlocking ring 170 via the side wall of the straight groove 175.

In accordance with the rotation of the interlocking ring 170 in the circumferential direction, the cam pin 173 also rotates in the circumferential direction of the fixed cylinder 110. The cam pin 173 moves inside the circumferential groove 196 and the cam groove 493, in the circumferential direction. Since the circumferential groove 196 is oriented in the circumferential direction of the lens frame 492, the position of the lens frame 492 in the direction of the optical axis X will not change even when the cam pin 173 rotates.

On the other hand, since the cam groove 493 is formed to tilt relative to the optical axis X, the lens frame 491 moves in the direction of the optical axis X, by being guided by the guide bars 104 and 108. In this way, in the focusing operation, the lens L21 can move without moving the other lenses L1, L22, L3, L4, and L5.

The lens barrel 103 as stated above can be manufactured by a manufacturing method including each step stated below. One of the steps provides a guide pipe 102 provided for the lens frame 492 holding the lens L22, along the optical axis X of the lens L22. In another step, provided is a support 412 for supporting the lens frame 492 to be movable in the direction of the optical axis X. In a still different step, a guide bar 104 is provided to a lens frame 491 holding a lens L21 different from the lens L22, which is movable with respect to the guide pipe 102 in the direction of the optical axis X by being restricted by the guide pipe 102.

Figure 9:
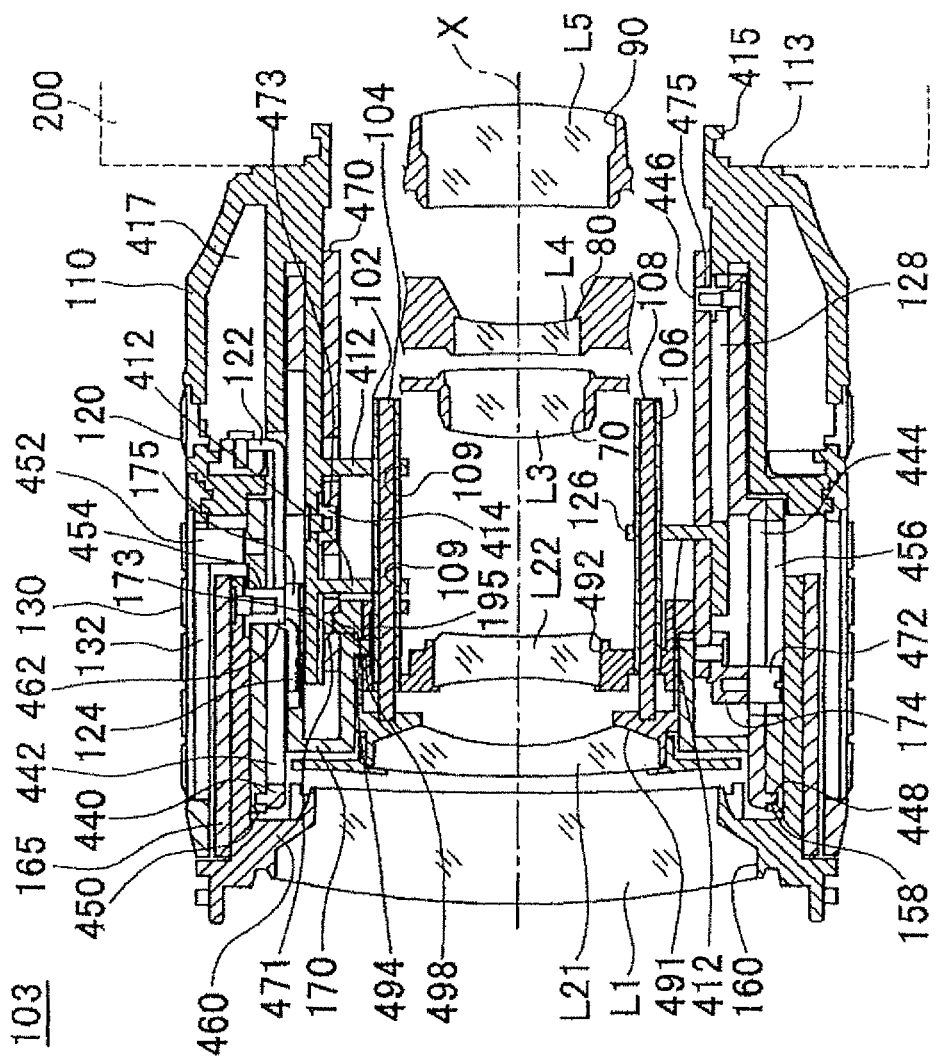
FIG. 9 is a sectional view of another structure of the lens barrel 103.

FIG. 9 is a sectional view of another structure of the lens barrel 103. This lens barrel 103 has a structure common to the lens barrel 103 as shown in FIG. 6, FIG. 7, and FIG. 8, except for the following. Therefore, in FIG. 9, the elements common to FIG. 6 and FIG. 7 are assigned the same reference numerals, and the explanation thereof is omitted.

In the lens barrel 103, the lens frame 491 holding the lens L21 is stretched towards the rear side, and includes a cam follower 494 engaging with the cam groove 471 of the cam cylinder 470. The lens frame 491 includes a circumferential groove 195 to which the cam pin 173 of the interlocking ring 170 is inserted.

In the fixed cylinder 110, the interlocking ring 170 is oriented towards the rear side between the cam cylinder 470 and the lens frame 491. In addition, after penetrating the circumferential groove 195 of the lens frame 491, the tip of the cam pin 173 of the interlocking ring 170 is engaged with the cam groove 498 formed for the lens frame 492.

In the lens barrel 103, when either the focusing grip 120 or the motor rotates the transmission member 122, the rotation driving force of the transmission member 122 is conveyed to the interlocking ring 170 via the side wall of the straight groove 175. The cam pin 173 rotated by the rotation of the interlocking ring 170 will move in the circumferential direction inside the circumferential groove 195 and the cam groove 498. Since the circumferential groove 195 is oriented in the circumferential direction of the lens frame 491, the position of the lens frame 491 in the direction of the optical axis X will not change even when the cam pin 173 rotates.

On the other hand, since the cam groove 498 is formed to tilt relative to the optical axis X, the lens frame 492 moves in the direction of the optical axis X, by being guided by the guide pipes 102 and 106. In this way, in the focusing operation, the lens L22 can move without moving the other lenses L1, L21, L3, L4, and L5.

Figure 10:
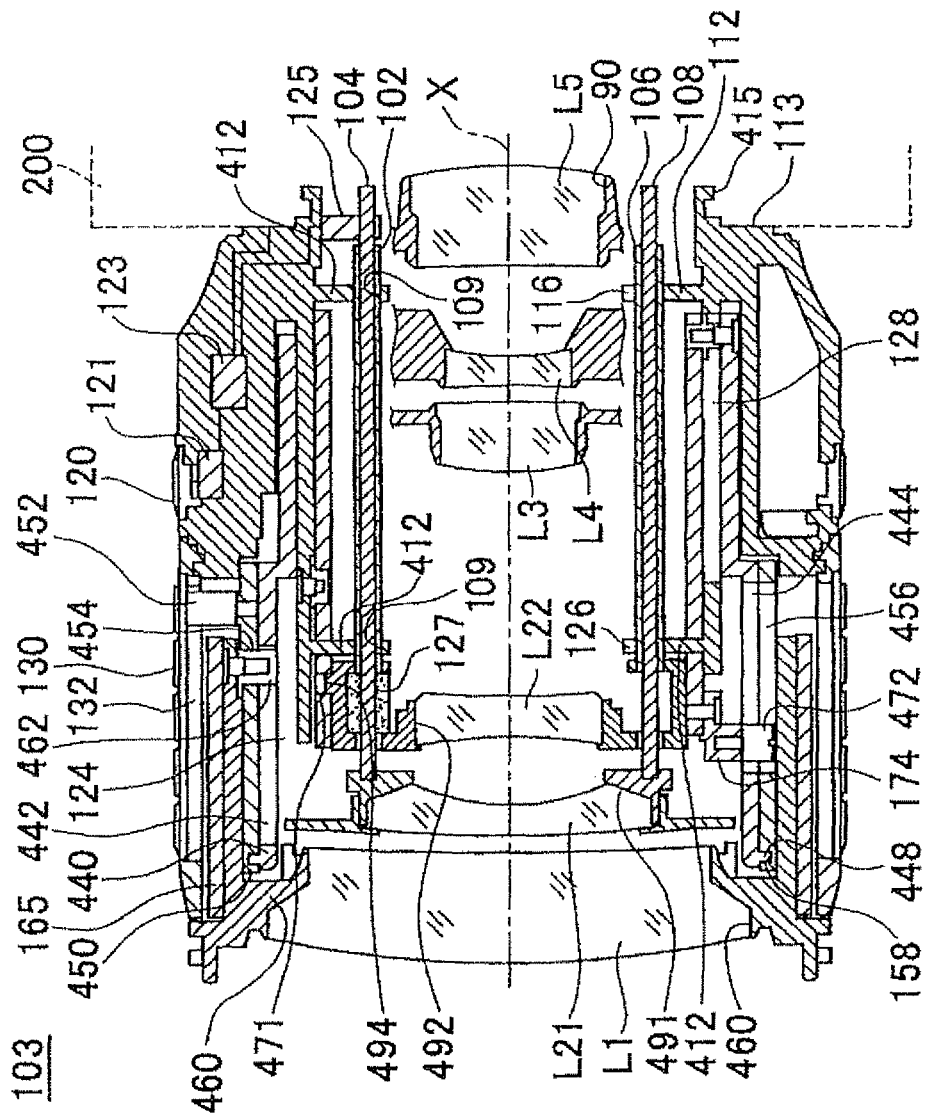
FIG. 10 is a sectional view of a still different structure of the lens barrel 103.

FIG. 10 is a sectional view of a still different structure of the lens barrel 103. In FIG. 10, the elements common to the other drawings are assigned the same reference numerals, and the explanation thereof is omitted.

In the lens barrel 103, the structure of the zoom ring 130, the inner cylinder 440, the intermediate cylinder 450, and the outer cylinder 150 is the same as the structure of those of the lens barrel 103 shown in FIG. 6 through FIG. 8. The difference is that the interlocking ring 170 is omitted and a linear actuator 127 to which a guide bar 104 is inserted is provided for the lens frame 492, in FIG. 10.

Both ends of the linear actuator 127 in the direction of the optical axis X are sandwiched between part of the lens frame 492, according to which the displacement thereof is restricted in the direction of the optical axis X with respect to the lens frame 492. In addition, the linear actuator 127 causes the guide bar 104 to move in the direction of the optical axis X, when driven in response to a driving signal.

In addition, in non-operation, the linear actuator 127 grasps the guide bar 104, to restrict the displacement of the guide bar 104 with respect to the lens frame 492 in the direction of the optical axis X. In other words, the linear actuator 127 while not operated integrally moves the guide bar 104, when the lens frame 492 moves in the direction of the optical axis X.

An example of the linear actuator 127 equipped with driving force and holding force with respect to the guide bar 104 is an actuator adopting an electromechanical conversion element such as a piezoelectric material and an electrostriction material. If using a device without self holding function such as a magnetic actuator to generate a driving force, the linear actuator 127 may be provided with a mechanism for grasping the guide bar 104.

In this lens barrel 103, the focusing grip 120 is mounted to the fixed cylinder 110 to be rotatable independently. In addition, a rotation amount detection section 121 and a barrel control section 123 are provided in the focusing grip 120. A moving amount detection section 125 is provided at the rear end of the guide bar 104.

The rotation amount detection section 121 detects the rotation amount of the focusing grip 120 having rotated by the rotation operation from outside, to generate a rotation amount signal being an electric signal according to the rotation amount. The rotation amount signal is transmitted to the barrel control section 123.

The stated rotation amount detection section 121 can be formed using a rotary scale that rotates with the focusing grip 120 and an optical sensor that counts the scale. The rotation amount detection section 121 can also be formed using a magnetic substance that rotates with the focusing grip 120 and a magnetic sensor that measures the change in magnetic field generated by the movement of the magnetic substance. However, the structure of the rotation amount detection section 121 is not limited to as described above.

When the guide bar 104 moves, the moving amount detection section 125 measures the moving amount of the guide bar 104, to generate a movement amount signal being an electric signal according to the moving amount. The moving amount signal is transmitted to the barrel control section 123.

The stated moving amount detection section 125 can be formed by a linear scale that integrally moves with the guide bar 104 and an optical sensor that counts the scale. The moving amount detection section 125 can also be formed by a magnetic substance that moves together with the guide bar 104 and a magnetic sensor that measures the change in the magnetic field generated by the movement of the magnetic substance. However, the structure of the moving amount detection section 125 is not limited to as described above.

When the focusing grip 120 is operated to rotate, the barrel control section 123 receives a rotation amount signal from the rotation amount detection section 121, and supplies a driving signal according to the rotation amount signal, to the linear actuator 127. The linear actuator 127 operates according to the supplied driving signal, to move the guide bar 104 in the axial direction. Accordingly, the lens frame 492 holding the lens L22 can be moved in the direction of the optical axis X independently, thereby focusing the optical system of the lens barrel 103.

when the lens barrel 103 performs the focusing operation by the autofocus mechanism of the image capturing section 200, the barrel control section 123 generates a driving signal in response to the instruction from the image capturing section 200. Accordingly, for both of the autofocus method and the manual focus method, a common linear actuator 127 can be used to move the lens L22.

The barrel control section 123 receives a moving amount signal from the moving amount detection section 125, and detects the moving amount of the guide bar 104. Accordingly, the driving signal to be supplied to the linear actuator 127 can be adjusted, to accurately move the lens L22 in accordance with the moving amount required for the focusing.

When the zoom ring 130 is rotated in the lens barrel 103, the driving force is transmitted from the cam groove 471 of the rotating cam cylinder 470 via the cam follower 494, to move the lens frame 492 guided to the guide pipes 102 and 106 in the direction of the optical axis X. During this operation, the linear actuator 127 which is not operating grasps the guide bar 104 to integrally move it with the lens frame 492. Accordingly, the two lenses L21 and L22 will move integrally, to change the focal length of the lens barrel 103.

Figure 11:
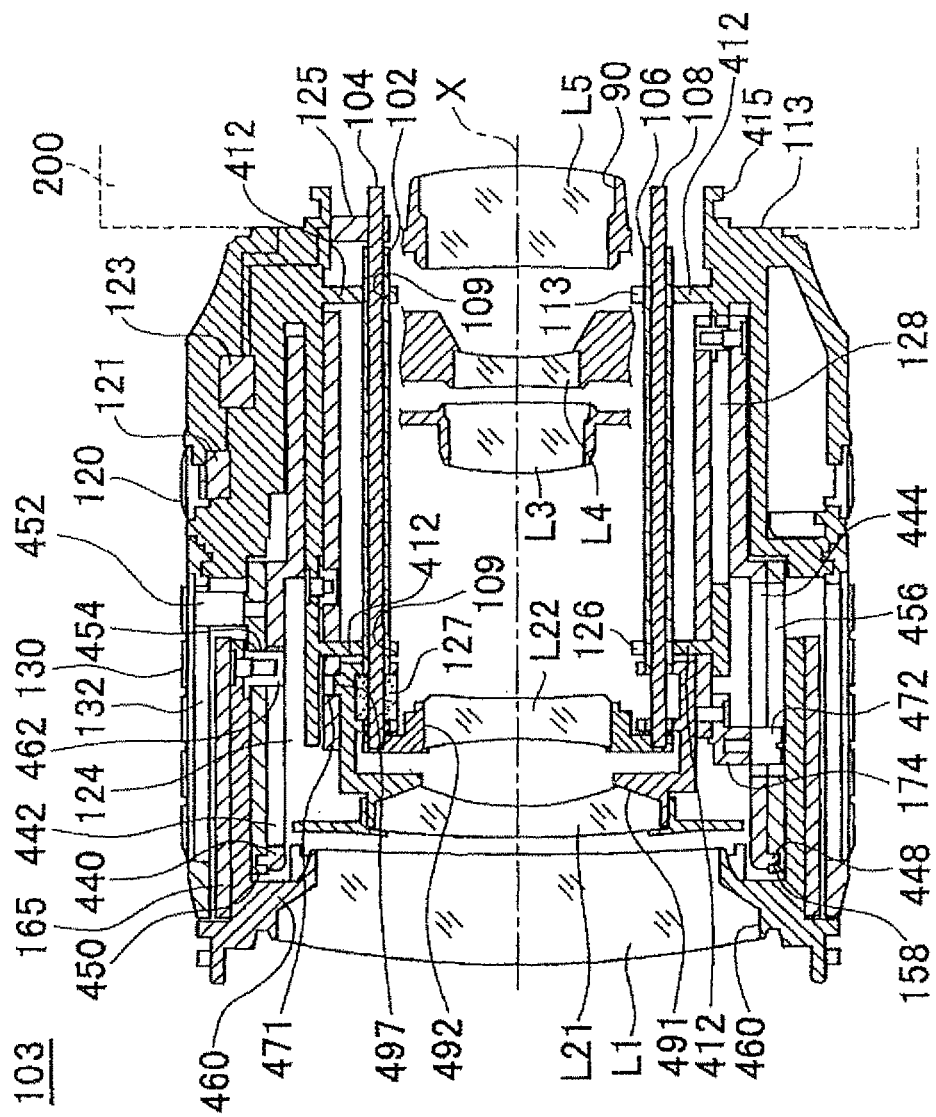
FIG. 11 is a sectional view of a further different structure of the lens barrel 103.

FIG. 11 is a sectional view of a further different structure of the lens barrel 103. This lens barrel 103 has a structure common to the lens barrel 103 as shown in FIG. 10, except for the following. Therefore, in FIG. 11, the elements common to FIG. 10 are assigned the same reference numerals, and the explanation thereof is omitted.

In the lens barrel 103, the lens frame 491 holding the lens L21 is oriented towards the rear side, and includes a cam follower 497 engaging with the cam groove 471 of the cam cylinder 470. The lens frame 491 is coupled to the guide pipes 102 and 106. Accordingly, when the cam cylinder 470 rotates by rotation of the zoom ring 130, the lens frame 491 will move in the direction of the optical axis X. The lens frame 492 is coupled to the guide bar 104 and 108.

The linear actuator 127 to which the guide bar 104 is inserted is held sandwiched by the lens frame 491 in the axial direction. Accordingly, when the linear actuator 127 is operated, the guide bar 104 moves in the axial direction with respect to the lens frame 491.

When the focusing grip 120 is operated to rotate, the barrel control section 123 receives a rotation amount signal from the rotation amount detection section 121, and supplies a driving signal according to the rotation amount signal, to the linear actuator 127. The linear actuator 127 operates according to the supplied driving signal, to move the guide bar 104 in the axial direction. Accordingly, the lens frame 491 holding the lens L21 can be moved in the direction of the optical axis X independently, thereby focusing the optical system of the lens barrel 103.

Figure 12:
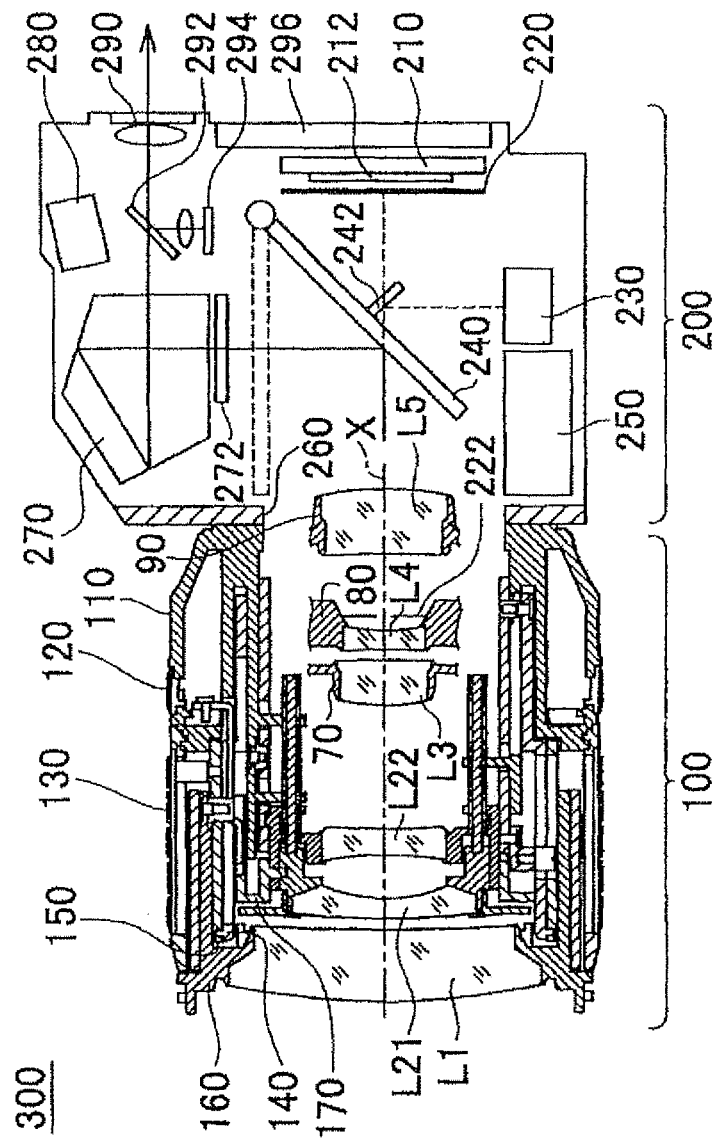
FIG. 12 is a schematic sectional view of an image capturing apparatus 301.

FIG. 12 is a schematic view of a structure of an image capturing apparatus 301 having a lens barrel 103. So as to simplify the drawing, FIG. 12 draws the lens barrel 103 schematically.

Note that the lens barrel 103 in FIG. 12 has the same structure as the lens barrel 103 shown in FIG. 6 through FIG. 8, except that the lens frame 80 in this drawing includes a diaphragm apparatus 222 in the lens frame 80. Therefore, in FIG. 12, the common elements are assigned the same reference numerals, and the overlapping explanation is omitted below.

The image capturing apparatus 301 includes a lens barrel 103 and an image capturing section 200. The lens barrel 103 is removably mounted to the mount 260 of the image capturing section 200.

The lens barrel 103 mounted to the image capturing apparatus 301 is also electrically coupled to the image capturing section 200 via a connection terminal not drawn in the drawing. As a result, the lens barrel 103 is supplied with power from the image capturing section 200. In addition, a signal is also transmitted to the image capturing section 200 from the lens barrel 103.

The image capturing section 200 accommodates therein an optical system and a main control section 250, where the optical system includes a primary mirror 240, a penta prism 270, and an ocular optical system 290. The primary mirror 240 moves between a wait position positioned tilted on the optical path of the incident light incident via the optical system of the lens barrel 103 and an image capturing position raising by avoiding the incident light (shown by the dotted line in the drawing).

The primary mirror 240 at the wait position introduces the most of the incident light to the focusing screen 272 provided above. The focusing screen 272 is positioned at a position at which an image is formed when the optical system of the lens barrel 103 comes into focus, to visualize the image.

The image focused on the focusing screen 272 can be observed from the ocular optical system 290 via the penta prism 270. Accordingly, the image on the focusing screen 272 can be seen as a normal image from the ocular optical system 290.

A half mirror 292 is provided between the penta prism 270 and the ocular optical system 290. The half mirror 292 causes the display image formed on the finder LCD 294 to be superimposed on the image of the focusing screen 272. As a result, at the output end of the ocular optical system 290, the image of the focusing screen 272 can be observed superimposed with the image of the finder LCD 294. Note that the information such as image capturing condition and setting condition of the image capturing apparatus 301 is displayed on the finder LCD 294.

A part of the output light from the penta prism 270 is guided towards a photometric unit 280. The photometric unit 280 measures the intensity and the distribution of the incident light, to enable the measurement result to be referred to when determining the image capturing condition.

A secondary mirror 242 is provided at the rear surface of the primary mirror 240 opposite to the incident surface of the incident light. The secondary mirror 242 guides a part of the incident light transmitted through the primary mirror 240 towards the focus detection apparatus 230 provided below. Consequently, when the primary mirror 240 is in the wait position, the focus detection apparatus 230 detects the focusing state of the optical system. When the primary mirror 240 has reached to the image capturing position, the secondary mirror 242 retreats from the optical path of the incident light, too.

At the rear side of the primary mirror 240 with respect to the incident light from the lens barrel 103, a shutter 220, an optical filter 212, and an image capturing element 210 are provided along the optical axis. Since the primary mirror 240 has moved to the image capturing position immediately before the shutter 220 is open, the incident light goes straight to be incident to the image capturing element 210. Accordingly, the image formed by the incident light will be converted to an electric signal by the image capturing element 210.

The image capturing section 200 includes a main LCD 296 facing to outside, at the back of the lens barrel 103. The main LCD 296 can display an image formed in the image capturing element 210 when the primary mirror 240 has moved to the image capturing position, as well as displaying various types of setting information for the image capturing section 200.

The main control section 250 controls the various operations as stated above, in an integrated manner. The main control section 250 can also form an autofocus mechanism for driving the lens barrel 103, by referring to the information on the distance up to the subject detected by the focus detection apparatus 230 of the image capturing section 200. It is also possible that the focus detection apparatus 230 form a focus aid mechanism by referring to the operation amount of the lens barrel 103.

The main control section 250 also controls opening/closing of a diaphragm apparatus 222 by exchanging information with the microcomputer of the lens barrel 103. Furthermore, the main control section 250 contributes to exposure automation, execution of scene modes, and execution of bracket image capturing, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, the processes, the steps, or the like in the apparatus, the system, the program, and the method described in the claims, the specification, and the drawings are not necessarily performed in the described order. The operations, the processes, the steps, or the like can be performed in an arbitrary order, unless the output of the former-described processing is used in the later processing. Even when expressions such as "First," or "Next," or the like are used to explain the operational flow in the claims, the specification, or the drawings, they are intended to facilitate the understanding of the invention, and are never intended to show that the described order is mandatory.

What is claimed is:

1. A lens barrel comprising:
  a first axial guide shaft supported by a reference member;
  a holding member that holds an optical system, the holding member being movable in an axial direction of the first guide shaft with respect to the reference member;
  an interlocking member that engages with the holding member, that moves in the axial direction of the first guide shaft while rotating around an optical axis of the optical system, and that drives the holding member to move along the first guide shaft without rotating the holding member, wherein
  the interlocking member has an engaging section that engages with the holding member,
  the holding member has an engaged section configured to engage with the engaging section of the interlocking member,
  one of the engaging section and the engaged section is provided along a circumferential direction, a center of which corresponds to the optical axis of the optical system, and
  the engaging section engages with the engaged section at a position (i) that, in the axial direction of the first guide shaft, is outside the area in which the first guide shaft extends, and (ii) that is on an extension line of the first guide shaft or between the extension line and an inner surface of the reference member.

2. The lens barrel according to claim 1, further comprising:
  a driving cylinder including a cam groove that engages with the interlocking member, wherein
  when rotated around the optical axis, the driving cylinder drives the interlocking member by means of the cam groove to cause the interlocking member to move linearly in the axial direction of the first guide shaft.

3. The lens barrel according to claim 1, wherein
  the engaged section has a groove formed along a circumference whose center corresponds to the optical axis of the optical system, and
  the engaging section includes a protrusion engaging with the groove.

4. The lens barrel according to claim 3, further comprising:
  an operation member that rotates with respect to the reference member at an angle of rotation corresponding to a moving range of the protrusion in relation to the groove, to rotate the interlocking member.

5. The lens barrel according to claim 3, wherein
  when the interlocking member rotates, the engaging section moves relatively along a cam section, to move the holding member in the axial direction of the first guide shaft.

6. The lens barrel according to claim 1, wherein
  the first guide shaft provided for a first holder that holds a first optical component, the first guide shaft being oriented in a direction of the optical axis, and
  the lens barrel further comprises:
  a support member that supports the first guide shaft to be movable in the direction of the optical axis; and
  a second guide shaft provided for a second holder that holds a second optical component different from the first optical component, the second guide shaft being movable with respect to the first guide shaft in the direction of the optical axis, by being restricted by the first guide shaft.

7. The lens barrel according to claim 6, wherein
  the first guide shaft is a hollow shaft, and
  the second guide shaft is inserted into the first guide shaft.

8. The lens barrel according to claim 6, wherein
  an image focusing position of an optical system is changed by moving the second guide shaft in relation to the first guide shaft, the optical system including the first optical component and the second optical component.

9. The lens barrel according to claim 6, wherein
  the support member includes a first engaging section and a second engaging section, the first engaging section engaging with the first guide shaft, and the second engaging section engaging with the first guide shaft at an interval from the first engaging section in the direction of the optical axis.

10. The lens barrel according to claim 9, wherein
an interval at which the first guide shaft supports the second guide shaft is larger than the interval between the first engaging section and the second engaging section.

11. The lens barrel according to claim 6, further comprising:
a third guide shaft provided for the first holder, and supported by another support member to be movable in the direction of the optical axis; and
a fourth guide shaft provided for the second holder, the fourth guide shaft being restricted by the third guide shaft to be movable with respect to the third guide shaft in the direction of the optical axis.

12. The lens barrel according to claim 6, further comprising:
a driving member that drives the first holder, wherein
a driving force of the driving member is provided to the first holder by the engaging section in the vicinity of the first guide shaft.

13. The lens barrel according to claim 6, comprising:
an engaging member that engages the second holder via a groove provided in the first holder in a circumferential direction of the first holder, the engaging member thereby moving integrally with the second holder in the direction of the optical axis, in accordance with movement of the first holder that is in accordance with movement of the first guide shaft in the direction of the optical axis, wherein
the second holder moves with respect to the first holder in the direction of the optical axis, by movement of the engaging section in the circumferential direction of the first holder.

14. The lens barrel according to claim 13, wherein
a range of engagement between the engaging section and the second holder is in a vicinity of the second guide shaft.

15. An image capturing apparatus comprising:
the lens barrel according to claim 1; and
an image capturing section that captures an image by the optical system.

16. A method of manufacturing a lens barrel, comprising:
providing a first axial guide shaft supported by a reference member;
providing a holding member that holds an optical system, the holding member being movable in an axial direction of the first guide shaft with respect to the reference member; and
providing an interlocking member that engages with the holding member, that moves in the axial direction of the first guide shaft while rotating around an optical axis of the optical system, and that drives the holding member to move along the first guide shaft without rotating the holding member, wherein
the interlocking member has an engaging section that engages with the holding member,
the holding member has an engaged section configured to engage with the engaging section of the interlocking member,
one of the engaging section and the engaged section is provided along a circumferential direction, a center of which corresponds to the optical axis of the optical system, and
the engaging section engages with the engaged section at a position (i) that, in the axial direction of the first guide shaft, is outside the area in which the first guide shaft extends, and (ii) that is on an extension line of the first guide shaft or between the extension line and an inner surface of the reference member.

17. A lens barrel comprising:
a first axial guide shaft supported by a reference member;
a holding member that holds an optical system, the holding member being movable in an axial direction of the first guide shaft with respect to the reference member;
an interlocking member including an engaging section that engages with the holding member, the interlocking member being configured to move in the axial direction while rotating around an optical axis of the optical system, and being configured to move along the first guide shaft without rotating the holding member, wherein the first guide shaft is provided for a first holder that holds a first optical component, and the first guide shaft is oriented in a direction of the optical axis;
a support member that supports the first guide shaft to be movable in the axial direction of the optical axis; and
a second guide shaft provided for a second holder that holds a second optical component different from the first optical component, the second guide shaft being movable with respect to the first guide shaft in the direction of the optical axis by being restricted by the first guide shaft, wherein
the support member includes a first engaging section and a second engaging section, the first engaging section engaging with the first guide shaft, and the second engaging section engaging with the first guide shaft at an interval from the first engaging section in the direction of the optical axis, and
an interval at which the first guide shaft supports the second guide shaft is larger than the interval between the first engaging section and the second engaging section.

18. A lens barrel comprising:
a first axial guide shaft supported by a reference member;
a holding member that holds an optical system, the holding member being movable in an axial direction of the first guide shaft with respect to the reference member;
an interlocking member including an engaging section that engages with the holding member, the interlocking member being configured to move in the axial direction of the first guide shaft while rotating around an optical axis of the optical system, and being configured to move along the first guide shaft without rotating the holding member, wherein the first guide shaft is provided for a first holder that holds a first optical component and the first guide shaft is oriented in a direction of the optical axis;
a support member that supports the first guide shaft to be movable in the direction of the optical axis;
a second guide shaft provided for a second holder that holds a second optical component different from the first optical component, the second guide shaft being movable with respect to the first guide shaft in the direction of the optical axis by being restricted by the first guide shaft;
a third guide shaft provided for the first holder, the third guide shaft being supported by the support member to be movable in the direction of the optical axis; and
a fourth guide shaft provided for the second holder, the fourth guide shaft being restricted by the third guide shaft to be movable with respect to the third guide shaft in the direction of the optical axis.

19. A lens barrel comprising:
a first axial guide shaft supported by a reference member;
a holding member holding an optical system, the holding member being movable in an axial direction of the first guide shaft with respect to the reference member;
an interlocking member including an engaging section that engages with the holding member, the interlocking member being configured to move in the axial direction of the first guide shaft while rotating around an optical axis of the optical system, and being configured to move along the guide shaft without rotating the holding member, wherein the first guide shaft is provided for a first holder that holds a first optical component and the first guide shaft is oriented in a direction of the optical axis;
a support member that supports the first guide shaft to be movable in the direction of the optical axis;
a second guide shaft provided for a second holder that holds a second optical component different from the first optical component, the second guide shaft being movable with respect to the first guide shaft in the direction of the optical axis by being restricted by the first guide shaft;
an engaging member that engages the second holder via a groove provided in the first holder in a circumferential direction of the first holder, the engaging member thereby moving integrally with the second holder in the direction of the optical axis, in accordance with movement of the first holder that is in accordance with movement of the first guide shaft in the direction of the optical axis, wherein
the second holder moves with respect to the first holder in the direction of the optical axis by movement of the engaging section in the circumferential direction of the first holder.

20. A lens barrel comprising:
a first guide shaft provided for a first holder that holds a first optical component, the first guide shaft being oriented in a direction of an optical axis of the first optical component;
a support member supporting the first guide shaft to be movable in the direction of the optical axis; and
a second guide shaft provided for a second holder that holds a second optical component different from the first optical component, the second guide shaft being movable with respect to the first guide shaft in the direction of the optical axis by being restricted by the first guide shaft, wherein
the support member includes a first engaging section and a second engaging section, the first engaging section engaging with the first guide shaft, and the second engaging section engaging with the first guide shaft at an interval from the first engaging section in the direction of the optical axis, and
an interval at which the first guide shaft supports the second guide shaft is larger than the interval between the first engaging section and the second engaging section.

21. A lens barrel comprising:
a first guide shaft provided for a first holder that holds a first optical component, the first guide shaft being oriented in a direction of an optical axis of the first optical component;
a support member that supports the first guide shaft to be movable in the direction of the optical axis;
a second guide shaft provided for a second holder that holds a second optical component different from the first optical component, the second guide shaft being movable with respect to the first guide shaft in the direction of the optical axis by being restricted by the first guide shaft;
a third guide shaft provided for the first holder, the third guide shaft being supported by the support member to be movable in the direction of the optical axis; and
a fourth guide shaft provided for the second holder, the fourth guide shaft being restricted by the third guide shaft to be movable with respect to the third guide shaft in the direction of the optical axis.

22. A lens barrel comprising:
a first guide shaft provided for a first holder that holds a first optical component, the first guide shaft being oriented in a direction of an optical axis of the first optical component;
a support member that supports the first guide shaft to be movable in the direction of the optical axis;
a second guide shaft provided for a second holder that holds a second optical component different from the first optical component, the second guide shaft being movable with respect to the first guide shaft in the direction of the optical axis by being restricted by the first guide shaft; and
an engaging member that engages the second holder via a groove provided in the first holder in a circumferential direction of the first holder, the engaging member thereby moving integrally with the second holder in the direction of the optical axis, in accordance with movement of the first holder that is in accordance with movement of the first guide shaft in the direction of the optical axis, wherein
the second holder moves with respect to the first holder in the direction of the optical axis by movement of the engaging section in the circumferential direction of the first holder.

23. A method for manufacturing a lens barrel, comprising:
supporting a first axial guide shaft by a reference member;
holding an optical system by a holding member movable in an axial direction of the first guide shaft with respect to the reference member;
providing an interlocking member including an engaging section that engages with the holding member, the interlocking member being configured to move in the axial direction of the first guide shaft while rotating around an optical axis of the optical system, and being configured to move along the guide shaft without rotating the holding member, wherein the first guide shaft is provided for a first holder that holds a first optical component, the first guide shaft being oriented in a direction of the optical axis;
supporting the first guide shaft to be movable in the direction of the optical axis by a support member; and
providing a second guide shaft for a second holder that holds a second optical component different from the first optical component, the second guide shaft being movable with respect to the first guide shaft in the direction of the optical axis by being restricted by the first guide shaft, wherein
the support member includes a first engaging section and a second engaging section, the first engaging section engaging with the first guide shaft, and the second engaging section engaging with the first guide shaft at an interval from the first engaging section in the direction of the optical axis, and
an interval at which the first guide shaft supports the second guide shaft is larger than the interval between the first engaging section and the second engaging section.

24. A method for manufacturing a lens barrel, comprising:
supporting a first axial guide shaft by a reference member;
holding an optical system by a holding member movable in an axial direction of the first guide shaft with respect to the reference member;
providing an interlocking member including an engaging section that engages with the holding member, the interlocking member being configured to move in the axial direction of the first guide shaft while rotating around an optical axis of the optical system, and being configured to move along the first guide shaft without rotating the holding member, wherein the first guide shaft is provided for a first holder that holds a first optical component and the first guide shaft is oriented in a direction of the optical axis;
supporting the first guide shaft to be movable in the direction of the optical axis by a support member; and
providing a second guide shaft for a second holder that holds a second optical component different from the first optical component, the second guide shaft being movable with respect to the first guide shaft in the direction of the optical axis by being restricted by the first guide shaft;
providing a third guide shaft for the first holder, the third guide shaft being supported by the support member to be movable in the direction of the optical axis; and
providing a fourth guide shaft for the second holder, the fourth guide shaft being restricted by the third guide shaft to be movable with respect to the third guide shaft in the direction of the optical axis.

25. A method for manufacturing a lens barrel, comprising:
supporting a first axial guide shaft by a reference member;
holding an optical system by a holding member movable in an axial direction of the first guide shaft with respect to the reference member;
providing an interlocking member including an engaging section that engages with the holding member, the interlocking member being configured to move in the axial direction of the first guide shaft while rotating around an optical axis of the optical system, and being configured to move along the first guide shaft without rotating the holding member, wherein the first guide shaft is provided for a first holder that holds a first optical component and the first guide shaft is oriented in a direction of the optical axis;
supporting the first guide shaft to be movable in the direction of the optical axis by a support member; and
providing a second guide shaft for a second holder that holds a second optical component different from the first optical component, the second guide shaft being movable with respect to the first guide shaft in the direction of the optical axis by being restricted by the first guide shaft; and
providing an engaging member that engages the second holder via a groove provided in the first holder in a circumferential direction of the first holder, the engaging member thereby moving integrally with the second holder in the direction of the optical axis, in accordance with movement of the first holder that is in accordance with movement of the first guide shaft in the direction of the optical axis, wherein
the second holder moves with respect to the first holder in the direction of the optical axis by movement of the engaging section in the circumferential direction of the first holder.

26. A method of manufacturing a lens barrel, comprising:
providing a first guide shaft provided for a first holder that holds a first optical component, the first guide shaft being oriented in a direction of an optical axis of the first optical component;
providing a support member that supports the first guide shaft to be movable in the direction of the optical axis; and
providing a second guide shaft provided for a second holder that holds a second optical component different from the first optical component, the second guide shaft being movable with respect to the first guide shaft in the direction of the optical axis by being restricted by the first guide shaft, wherein
the support member includes a first engaging section and a second engaging section, the first engaging section engaging with the first guide shaft, and the second engaging section engaging with the first guide shaft at an interval from the first engaging section in the direction of the optical axis, and
an interval at which the first guide shaft supports the second guide shaft is larger than the interval between the first engaging section and the second engaging section.

27. A method of manufacturing a lens barrel, comprising:
providing a first guide shaft provided for a first holder that holds a first optical component, the first guide shaft being oriented in a direction of an optical axis of the first optical component;
providing a support member supporting the first guide shaft to be movable in the direction of the optical axis; and
providing a second guide shaft provided for a second holder that holds a second optical component different from the first optical component, the second guide shaft being movable with respect to the first guide shaft in the direction of the optical axis by being restricted by the first guide shaft;
providing a third guide shaft provided for the first holder, the third guide shaft being supported by the support member to be movable in the direction of the optical axis; and
providing a fourth guide shaft provided for the second holder, the fourth guide shaft being restricted by the third guide shaft to be movable with respect to the third guide shaft in the direction of the optical axis.

28. A method of manufacturing a lens barrel, comprising:
providing a first guide shaft provided for a first holder that holds a first optical component, the first guide shaft being oriented in a direction of an optical axis of the first optical component;
providing a support member supporting the first guide shaft to be movable in the direction of the optical axis; and
providing a second guide shaft provided for a second holder that holds a second optical component different from the first optical component, the second guide shaft being movable with respect to the first guide shaft in the direction of the optical axis by being restricted by the first guide shaft; and
providing an engaging member that engages the second holder via a groove provided in the first holder in a circumferential direction of the first holder, the engaging member thereby moving integrally with the second holder in the direction of the optical axis, in accordance with movement of the first holder that is in accordance with movement of the first guide shaft in the direction of the optical axis, wherein the second holder moves with respect to the first holder in the direction of the optical axis by movement of the engaging section in the circumferential direction of the first holder.

29. A lens barrel comprising:

a first axial guide shaft supported by a reference member;

a holding member that holds an optical system, the holding member being movable in an axial direction of the first guide shaft with respect to the reference member; and an interlocking member that engages with the holding member, that moves in the axial direction of the first guide shaft while rotating around an optical axis of the optical system, and that drives the holding member to move along the first guide shaft without rotating the holding member, wherein the interlocking member has an engaging section configured to engage the holding member and provided along a circumferential direction, a center of which corresponds to the optical axis of the optical system, the holding member has an engaged section configured to engage with the engaging section of the interlocking member, and the engaging section engages with the engaged section at a position (i) that, in the axial direction of the first guide shaft, is outside the area in which the first guide shaft extends, and (ii) that is on an extension line of the first guide shaft or at a position between the extension line and an inner surface of the reference member.

30. The lens barrel according to claim 29, wherein the engaging section of the interlocking member has a groove formed along a circumference whose center corresponds to the optical axis of the optical system, and the engaged section includes a protrusion engaging with the groove.

* * * * *